(12) United States Patent
Bridgeman, II et al.

(10) Patent No.: US 11,610,048 B2
(45) Date of Patent: *Mar. 21, 2023

(54) STRADDLING SYSTOLIC RULETREE

(71) Applicants: Richard Charles Bridgeman, II, Carlsbad, CA (US); Rex Andrew West, Vista, CA (US)

(72) Inventors: Richard Charles Bridgeman, II, Carlsbad, CA (US); Rex Andrew West, Vista, CA (US)

(*) Notice: Subject to any disclaimer, the term of this patent is extended or adjusted under 35 U.S.C. 154(b) by 175 days.

This patent is subject to a terminal disclaimer.

(21) Appl. No.: 16/383,606

(22) Filed: Apr. 13, 2019

(65) Prior Publication Data
US 2019/0236129 A1  Aug. 1, 2019

Related U.S. Application Data

(63) Continuation of application No. 15/409,988, filed on Jan. 19, 2017, now Pat. No. 10,268,668.

(Continued)

(51) Int. Cl.
*G06F 17/00* (2019.01)
*G06F 40/137* (2020.01)
(Continued)

(52) U.S. Cl.
CPC .......... *G06F 40/137* (2020.01); *G06F 3/0482* (2013.01); *G06F 40/131* (2020.01);
(Continued)

(58) Field of Classification Search
CPC ...... G06F 40/186; G06F 40/14; G06F 40/131; G06F 40/137; G06F 40/154; G06F 40/174; G06F 40/205; G06F 3/0482
See application file for complete search history.

(56) References Cited

U.S. PATENT DOCUMENTS 7,698,635 B2 * 4/2010 Grigoriadis ........... G06F 40/106
715/255
2003/0120663 A1 * 6/2003 Vining .................... G06F 16/21
(Continued)

OTHER PUBLICATIONS

Ashley, Kevin D., and Vern R. Walker. "Toward constructing evidence-based legal arguments using legal decision documents and machine learning." Proceedings of the fourteenth international conference on artificial intelligence and law. 2013 (Year: 2013).*

(Continued)

*Primary Examiner* — Andrew T McIntosh

(57) ABSTRACT

Systems for generating a USPTO office action response document based on an input USPTO Office Action document. A method implementation for constructing the USPTO office action response traverses a ruletree that has been dynamically formed from user answers to successive questions based on characteristics of the USPTO Office Action document. The ruletree comprises a first set of data items that pertains to an HCI and the ruletree further comprises a second set of data items that pertain to the target USPTO office action response document. Correspondence between the set of user answers to questions and passages in the USPTO office action response document are maintained in the ruletree. The ruletree expands and contracts during user interaction. To generate the USPTO office action response document, the ruletree is traversed in a sorted order, where traversal of a node generates a passage or passages in the generated USPTO office action response document.

25 Claims, 33 Drawing Sheets

Related U.S. Application Data

(60) Provisional application No. 62/414,764, filed on Oct. 30, 2016, provisional application No. 62/380,481, filed on Aug. 28, 2016, provisional application No. 62/281,181, filed on Jan. 20, 2016.

(51) Int. Cl.
| | |
|---|---|
| *G06F 3/0482* | (2013.01) |
| *G06F 40/186* | (2020.01) |
| *G06F 40/14* | (2020.01) |
| *G06F 40/131* | (2020.01) |
| *G06F 40/154* | (2020.01) |
| *G06F 40/174* | (2020.01) |
| *G06F 40/205* | (2020.01) |

(52) U.S. Cl.
CPC ............ *G06F 40/14* (2020.01); *G06F 40/154* (2020.01); *G06F 40/174* (2020.01); *G06F 40/186* (2020.01); *G06F 40/205* (2020.01)

(56) References Cited

U.S. PATENT DOCUMENTS

| | | | |
|---|---|---|---|
| 2010/0179962 A1* | 7/2010 | Schuster | G06F 40/174 |
| | | | 707/769 |
| 2013/0091422 A1* | 4/2013 | Potnis | G06F 40/131 |
| | | | 715/255 |
| 2013/0238987 A1* | 9/2013 | Lutwyche | G06F 40/166 |
| | | | 715/256 |
| 2014/0068422 A1* | 3/2014 | Rajkumar | G06F 40/20 |
| | | | 715/243 |

OTHER PUBLICATIONS

Reiter, Ehud, Chris Mellish, and John Levine. "Automatic generation of technical documentation." Applied Artificial Intelligence an International Journal 9.3 (1995): 259-287 (Year: 1995).*

\* cited by examiner

500

```
document.oar.qgroups['Rejection101Amdocs'] = function(parent)
{
    return questionGroup( //Question Group Title
       'Rejection Of Claims Under 35 USC 101',           ← Interaction Identifier
                                                            502
       //Question Group meta data
       {
          key: 'Rejection101Amdocs',
          uniqueID: makeUniqueID('qgroup');,
          parent: parent,                                 ← Parent Indication 504
          sortKey: 1020508                                ← Static Portion of
       },                                                    Sort Key 506

//Question List
       {
          question(
             'Which claim do you want to argue?',
                {
                   key: 'Rejected101ClaimSample',
                   inputtype: 'number',                   ← Interaction Screen
                   placeholder: 'e.g. 1'                     Device 508
                }
          ),
          question(
             'What is the full text of the claim you intend to argue?',
                {
                   key: 'Rejected101ClaimSampleFullText',
                   fullsize: true,
                   autocomplete: 'claimtext',
                   acclaimtextsource: 'fullyaccepted',
                   acclaimnumber: '*Rejected101ClaimSample',
                   acclaimelement: '~1'
                }
          ),
          question(
             'What portion of the argued claim do you want to present?',
                {
                   key: 'Rejected101ClaimSampleSnippet',
                   fullsize: true
                },
                //Action
                function (value, item) {
                   if(requiresAdditionalEmphasis(value))
                   {
                       addQuestionGroup(item.closest('.question-
group').prop('id'),                                      ← Rule Addition
                           'Rejection101EmphasizedSnippet', item);    Instruction 510
                   }
                },
                //De-action
                function (value, item)
                {
                   removeAllChildQuestionGroupsDeaction(value, item); ← Rule Deletion
                }                                                        Instruction 512
             )
       ]//End question list
    );//End Question Group
}//End qgroup generator function
```

STRADDLING SYSTOLIC RULETREE

RELATED APPLICATIONS

The present application is a continuation of and claims the benefit of priority to co-pending U.S. patent application Ser. No. 15/409,988, titled STRADDLING SYSTOLIC RULETREE, filed Jan. 19, 2017, hereby incorporated by reference in its entirety, which application claims the benefit of priority to U.S. Provisional Patent Application Ser. No. 62/281,181 titled, "GENERATING CORRECT-BY-CONSTRUCTION OFFICE ACTION REPLIES FROM AN INTERVIEW AND ONLINE CORPORA", filed Jan. 20, 2016, which is hereby incorporated by reference in its entirety; and the present application claims the benefit of priority to U.S. Provisional Patent Application Ser. No. 62/380,481 titled, "GENERATING CORRECT-BY-CONSTRUCTION USPTO OFFICE REPLIES FROM AN INTERVIEW AND ONLINE CORPORA", filed Aug. 28, 2016, which is hereby incorporated by reference in its entirety, and the present application claims the benefit of priority to U.S. Provisional Patent Application Ser. No. 62/414,764 titled, "GENERATING CORRECT-BY-CONSTRUCTION USPTO OFFICE REPLIES FROM A PROSECUTION STRATEGY DESCRIPTION AND ONLINE CORPORA", filed Oct. 30, 2016, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

This disclosure relates to techniques for management of a rulebase to drive a human-computer interface.

BACKGROUND

There are many systems that solicit user input pertaining to fields or other aspects of a human-readable document. For example, a software program for outputting a US IRS FORM 1040 might present questions to a human user, and on the basis of the user's responses, the software program will output the FORM 1040 that includes user-provided responses in corresponding fields (e.g., the field "Social Security Number" will contain the social security number as provided by the human user). In this case, the format for the output document is static (e.g., fixed), so the human-computer interaction (HCI) can merely present questions to the user in an order that corresponds to the output document.

Other systems for generating an output document might not know the precise format for the output document, and instead rely on a static (e.g., fixed) flow through an interview process to ask questions of the user and, on the basis of whether or not or how the user answers a particular question, the output document is dynamically structured based on the user's progression through the interview Unfortunately, there are many situations where neither the format and/or flow of the output document nor the flow of the interview process can be known before the interview process begins. This sets up the deadlock scenario where the interview flow cannot be known from the format of the intended output document (e.g., as in the FORM 1040 case) and, at the same time, the form of the objective output document cannot be known until the interview is complete.

What is needed is a way to generate an objective output document even when (1) the completed form of the objective document is not known a priori, and (2) even when the completed form of the interview flow is not known a priori.

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products pertaining to making and using a systolic ruletree to drive a human-computer interface, which techniques advance the relevant technologies to address technological issues with legacy approaches. More specifically, the present disclosure provides a detailed description of techniques used in systems, methods, and in computer program products for managing a systolic ruletree during computer-aided generation of a target output document. Certain embodiments are directed to technological solutions to dynamically construct correspondence rules between fields of a web page and portions of a target output document.

The disclosed embodiments modify and improve over legacy approaches. In particular, the herein-disclosed techniques provide technical solutions that address the technical problems attendant to breaking the deadlock scenario where an HCI interview flow cannot be known from the format of a target output document and, at the same time, the format of the target output document cannot be known until the interview is complete.

Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of human-machine interfaces as well as advances in various technical fields related to automated generation of electronic documents.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure. This patent or application file contains at least one drawing executed in color. Copies of this patent or patent application publication with color drawings will be provided by the U.S. Patent and Trademark Office upon request and payment of the necessary fee.

FIG. 1A exemplifies a document-defined interview structure based on a predefined target document.

FIG. 5 depicts an example schema as used by a rules engine during management of a systolic ruletree during computer-aided generation of a target output document, according to an embodiment.

FIG. 8G presents a dynamically-generated question group as used in systems that perform computer-aided generation of a target output document based on a systolic ruletree, according to an embodiment.

FIG. 10D depicts an HCI screen to present a set of filled-in fields after parsing a USPTO office action, according to an embodiment.

DETAILED DESCRIPTION

Figure 1A:
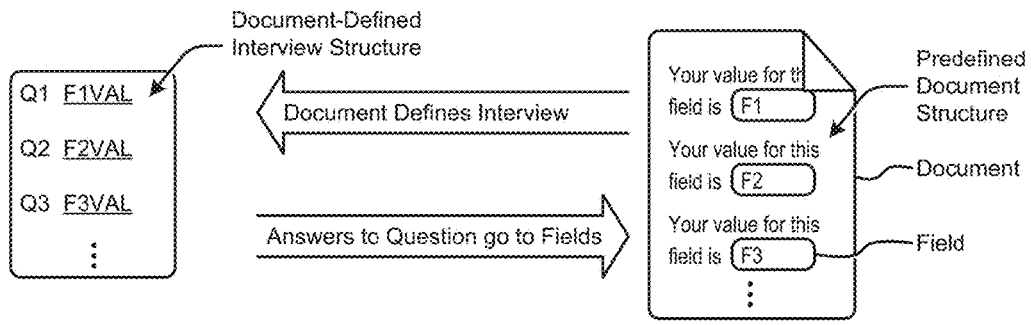
FIG. 1B exemplifies a predefined interview structure used to generate a congruent target document.
FIG. 1C depicts a system that combines user interaction with an interview together with rule processing techniques to manage a systolic ruletree during computer-aided generation of a target output document, according to an embodiment.

Embodiments in accordance with the present disclosure address the problem of breaking the deadlock scenario where an HCI interview flow cannot be known from the format of a target output document and, at the same time, the format of the target output document cannot be known until the interview is complete. Some embodiments are directed to specialized data structures for implementing a straddling systolic ruletree. Ongoing management of a straddling systolic ruletree includes approaches for dynamically constructing correspondence rules that straddle between fields of a web page and portions of a target output document. The accompanying figures and discussion herein present example environments, systems, methods, and computer program products for managing a systolic ruletree during computer-aided generation of a target output document.

OVERVIEW

Herein disclosed are techniques for interacting with a user through a human-computer interface (HCI) using a straddling systolic ruletree. In the shown embodiments, rules from a rulebase are organized into a ruletree. After user interaction, and upon user indication of readiness to generate an output document, the ruletree can be traversed by passing through each node of the ruletree and outputting a portion of a target document upon traversal through a node.

The systolic nature of the rulebase facilitates generation of documents where the composition and flow of the target document is not known until after the user interaction. Also, the systolic nature of the rulebase facilitates generation of a series of HCI screen devices (e.g., web widgets, text fields, pulldown menus, checkboxes, etc.) where the composition and flow of the series of HCI screen devices is based on successive user interactions.

The straddling nature of the rulebase facilitates generation of documents where the composition and flow of the target document is characterized using HCI screen devices. A straddling ruletree captures a set of rules, any instance of which characterizes both (1) characteristics of the HCI, and (2) characteristics of a target output document. To maintain synchrony between constituent elements of the HCI and constituent elements of a target output document, a single graph (e.g., a ruletree) is maintained, where a graph is formed by nodes in the form of the aforementioned specialized data structures and the edges represent interconnections (e.g., in a tree topology) between occurrences of those specialized data structures.

As disclosed herein, the straddling systolic ruletree is an input to a document generation process, which process facilitates generation of a target document composed of an ordered set of passages. The systolic nature of the rulebase facilitates generation of a target document composed of an ordered set of passages even when the composition and flow of the target document cannot be known in advance of user interaction with the HCI.

Illustrative Use Case

To illustrate, consider a specific embodiment where the systolic ruletree is implemented in a web application that is configured to take in, as a primary input, an office action from the USPTO, and then, through interaction with a patent practitioner, produce an office action response in the form of an output document. As can be seen, the content and flow of the office action cannot be known until the office action is composed by the examiner, and the content and flow of an output document cannot be known by the system until the system has parsed the office action materials. Moreover, the content and flow of the output document cannot be known until the input office action document is acted upon by the system.

Continuing, suppose that the office action rejects all claims (e.g., claims 1-20) based on anticipation, also rejects a group of dependent claims based on obviousness. Further, consider that the practitioner might initially plan to argue over all rejections without amendments. In such a case, the practitioner's intent implies 20 or more paragraphs—that is, at least one paragraph or passage for each of the 20 arguments. To codify this intent, the web application might initially fire a first rule that schedules emission of paragraphs or passages corresponding to the practitioner's intent to address all 20 rejected claims. This would put 21 rules into the ruletree.

At some subsequent moment in time, the practitioner interacts with the web application, and might decide (e.g., by virtue of information brought forward during interaction with the web application) to amend independent claim 1. In doing so, the practitioner's arguments that had been formulated to address the claims that depend from claim 1 might become moot, and thus are candidates be removed. This is shown pertaining to time sequence T2 and time sequence T3 in Table 1.

TABLE 1

Sample systolic expansion and contraction of a ruletree

| Time Sequence | Description | Number of rules in the ruletree after additions and/or deletions |
|---|---|---|
| 0 | Initial state of ruletree | 0 |
| T1 | Create a root node in the ruletree | 1 |
| T2 | Decide to argue independent claim 1 and dependent claims 2-19. Add 20 rules to the ruletree. | 21 |
| T3 | Decide to amend and argue independent claim 1 only. Delete 19 rules from the ruletree. | 2 |
| T4 | Office action parsing detects a provisional non-statutory double patenting rejection (NSDP). Add an NSDP rule and its "terminal disclaimer" child to the ruletree. | 4 |
| T5 | Practitioner decides to acknowledge the NSDP rejection, but delay submission of a terminal disclaimer. Delete the NSDP "terminal disclaimer" child from the ruletree. | 3 |

The practitioner might further interact with the web application. Specifically, the web application might present additional results of parsing the office action. More specifically, the web application might add a rule or rules to the ruletree and present the added rule or rules to the practitioner in the form of a checkbox and/or a text box, and/or other screen devices. The practitioner might interact with the screen devices and decide to concur with the added rules, or the practitioner might interact with the screen devices to concur with only a portion of the added rules. Such a case is depicted in Table 1 as time sequence T4 and T5.

The foregoing example is merely for illustration. Any form or forms of input documents (e.g., not only USPTO communications such as office actions) and/or any form or forms of output documents (e.g., not only human-readable documents such as responses to office actions) are contemplated.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A exemplifies a document-defined interview structure based on a predefined target document. As shown to the right of FIG. 1A, a document is composed of fields, and each field has a corresponding value. The document has content and flow in a predefined document structure. The predefined document structure itself defines the interview. Accordingly, the interview has a document-defined structure. For each field in the document, the interview solicits an answer/value from a user, and the given answer/value is merely populated into the predefined document structure on a one-to-one basis.

Figure 1B:
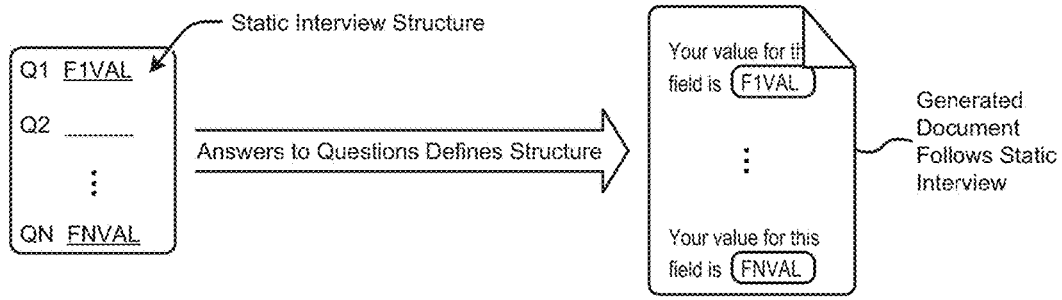

FIG. 1B exemplifies a predefined interview structure used to generate a congruent target document. User interaction proceeds according to a static interview structure. Some questions in the interview might be answered, and some might not be answered. Accordingly, where the user did answer a question, the value is used in the generated document. Where the user did not answer a question, there is no corresponding emission in the generated document. The output document merely follows in accordance with the static interview structure.

In the foregoing two cases of FIG. 1A and FIG. 1B, either the target output document is predefined, or the interview is predefined. In both such cases there is a one-to-one correspondence between an interview question/answer and a passage in the target output document. However, when neither the interview nor the output document are predefined, the need for a specialized data structure emerges. More specifically, when neither the interview nor the output document are predefined, legacy forms of codifying an interview, such as in HTML, or codifying an output document, such as in XML, are glaringly deficient, at least inasmuch as dynamically rewriting the HTML and/or dynamically rewriting the XML during a dynamic interview process is highly inefficient. A specialized data structure in the form of the herein-disclosed ruletree is designed to improve the way a computer stores and retrieves data in memory when performing steps pertaining to the interview and document construction process. As further discussed hereunder, the data in the specialized data structure is organized for high-performance additions, subtractions, and retrievals during update and analysis operations.

One example of use of such a specialized data structure is given in the following FIG. 1C. Specifically, a rules engine operates over a ruletree to perform additions, subtractions, and retrievals during update and analysis operations that arise during the interview process. Such update and analysis operations are shown and discussed as pertains to FIG. 1C.

Figure 1C:
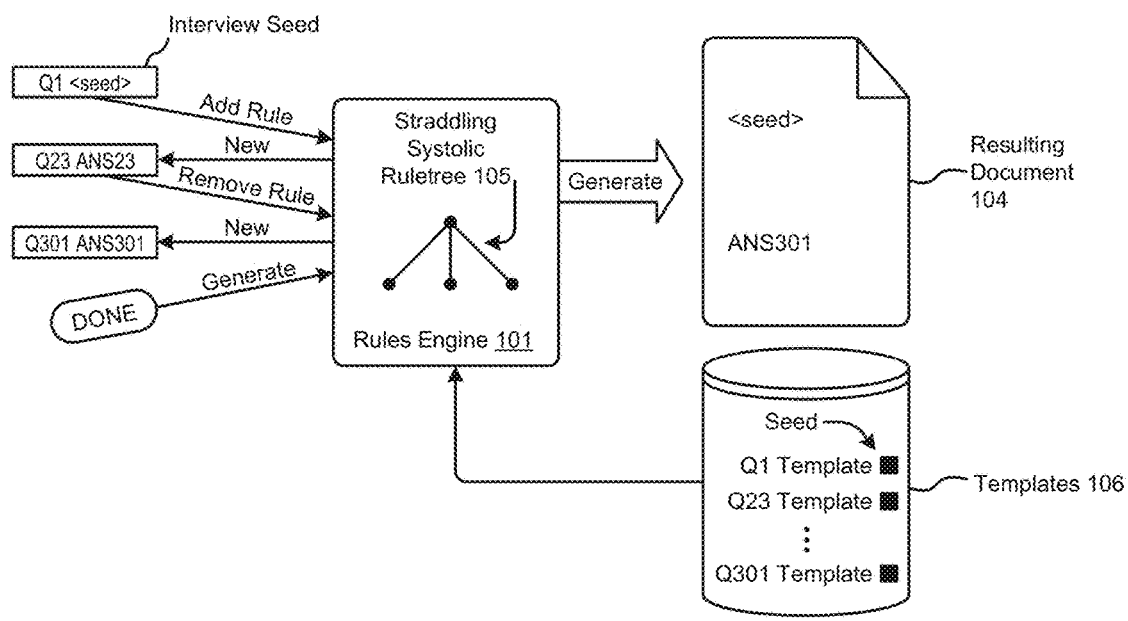

FIG. 1C depicts a system that combines user interaction with an interview together with rule processing techniques 1C00 to manage a systolic ruletree during computer-aided generation of a target output document. As an option, one or more variations of rule processing techniques 1C00 or any aspect thereof may be implemented in the context of the architecture and functionality of the embodiments described herein. The rule processing techniques 1C00 or any aspect thereof may be implemented in any environment.

The embodiment shown in FIG. 1C is merely one example. As shown, the rule processing techniques includes a rules engine 102 that receives commands pertaining to rules and/or commands pertaining to operations that are performed on a ruletree. In this exemplary embodiment, neither the interview nor the output document are predefined. Rather, a seed template and a set of question templates are provided in a template database. The first question of the interview is initially "seeded" with a question template that is identified as a seed. In the shown example the seed refers to first interview question "Q1". In some cases the first interview question might have a predefined answer, and the seed question might be used merely for forming a root node in a ruletree.

As shown, the seed refers to the Q1 template, which in turn is presented in an interview. The question referred to by the seed might result (as shown) in signaling a command to or invoking a command at the rules engine to perform the addition of a rule to the ruletree. The act of processing such a command by the rules engine, and more specifically the act of adding a rule to the ruletree, carries with it additional instructions to "fire" an action, which action might be to fire another rule, which action might be to fire another rule, and so on, so long as the conditions for firing an action or a rule are met at the time of consideration for firing.

Continuing this example, the depiction shows that at least one new rule was fired as a result of the addition. Specifically, a new rule with question "Q23" is fired, resulting in presentation of question "Q23" in the interview. This example depicts the case where the answer in the interview to "Q23" results in a command to remove a rule from the ruletree. Upon presentation of the remove command, the rules engine deletes the rule from the ruletree and processes any additional action(s) pertaining to the received command. In the shown example, the additional action pertaining to the received command is to present question Q301 in the interview HCI. At some point, the interview is deemed to be complete, and the user might issue a generate command to the rules engine. The rules engine in turn parses the then-current ruletree and generates a resulting document 104 from the then-current ruletree.

As can be seen in this example, neither the interview nor the output document are predefined. Rather, a straddling systolic ruletree 105 and a set of templates 106 together define both the interview and the output document.

Figure 2A:
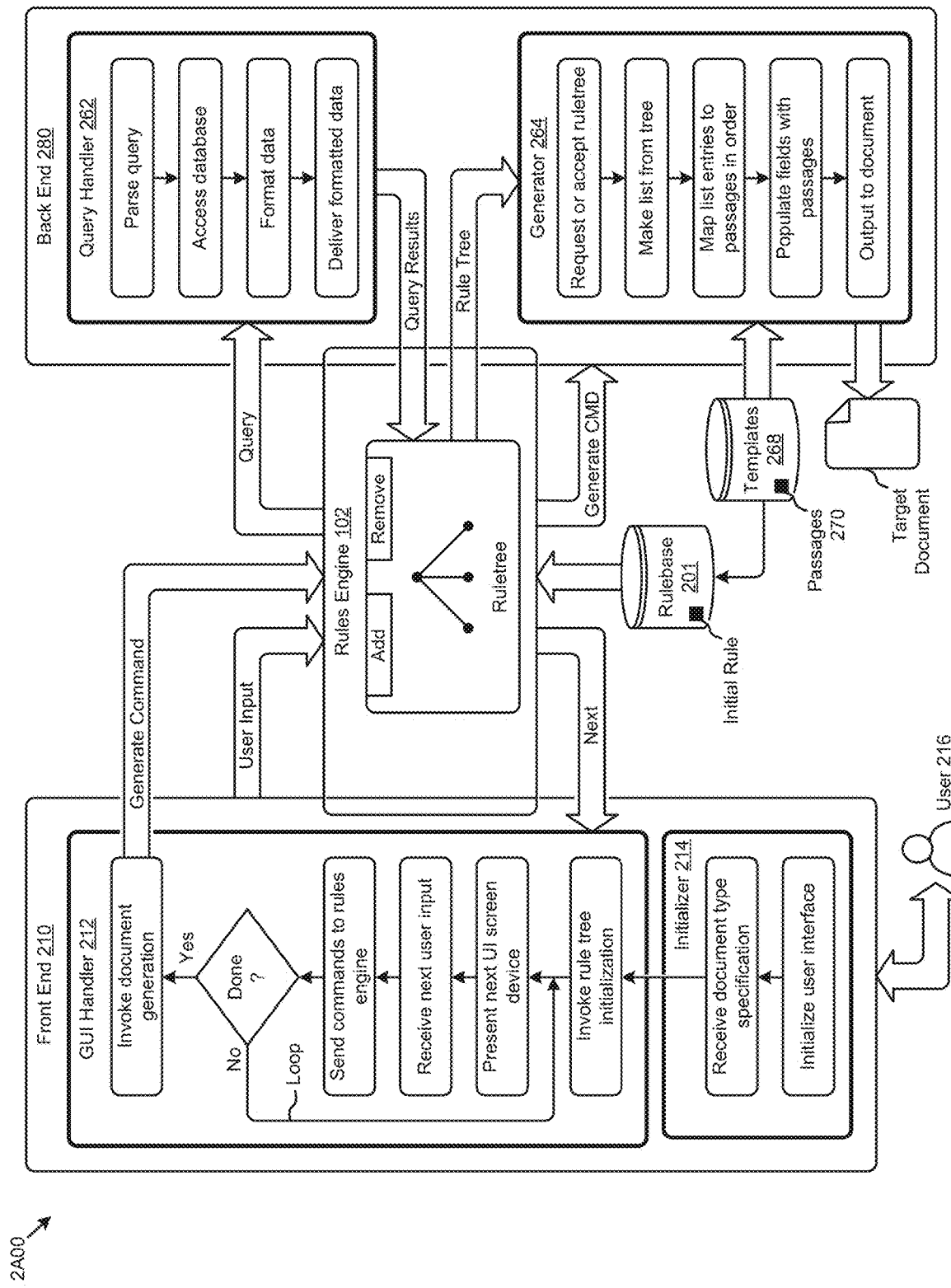
FIG. 2A is a block diagram of a client-server processing environment suitable for managing a systolic ruletree during computer-aided development of a target output document, according to an embodiment.

A computing system for carrying out the (1) interaction with a user, (2) systolic expansion/contraction of a ruletree, and (3) generation of an output document based on the ruletree is shown and described as pertains to FIG. 2A.

FIG. 2A is a block diagram of a client-server processing environment 2A00 suitable for managing a systolic ruletree during computer-aided development of a target output document. As an option, one or more variations of client-server processing environment 2A00 or any aspect thereof may be implemented in the context of the architecture and functionality of the embodiments described herein.

The embodiment shown in FIG. 2A is composed of a front end 210 and a back end 280. In some cases the front end is assigned to perform HCI operations (e.g., using graphical user interface handler 212), while the back end is assigned to handle information retrieval (e.g., database queries using a query handler 262) and output document generation (e.g., using a generator 264).

As shown, the rules engine 102 interacts with both the front end and the backend. Accordingly, some functions of the rules engine are embodied in the front end, and some functions of the rules engine are embodied in the back end. Some functions of the shown rules engine can be partitioned into any processing entity, possibly as a separate process, task or thread that runs independently from either the front end or the back end.

The rules engine 102 manages systolic expansion and contraction of a ruletree. A ruletree might be initially populated with merely a root, which might come from a rulebase 201 having at least one initial rule. An initial rule or any other rule can have a relationship with one or more templates 268, which templates in turn include passages 270. The templates and any corresponding passages are used when generating a target document.

Ahead of user interaction (i.e., ahead of received user input), the initializer 214 of the front end 210 initializes a user interface and interacts with a user 216 to receive a document type specification. The document type specification in turn can be used to prepopulate the ruletree. For example, a given document type specification might cause formation of an initial ruletree with a root node corresponding to the document type as given. Such an initialization and prepopulation of the ruletree can be partitioned to run fully or partially within initializer 214, and/or fully or partially within the GUI handler 212. In either case, after ruletree initialization has been invoked (e.g., by sending a command to the rules engine), a loop is entered. The loop cycles through operations to interact with the user, namely by (1) presenting a screen device in the GUI, (2) receiving next user inputs, and (3) sending commands to the rules engine, where the commands sent to the rules engine are responsive to the user inputs. This loop continues until done, at which point the user might invoke document generation.

During the looping, and more particularly during the repeated pattern of receiving next user inputs and sending commands to the rules engine, the rules engine is managing expansion and contraction of the ruletree. As shown, user input is sent to the rules engine and, in turn, next rules are sent from the rules engine to the GUI handler. The rules engine can take in an explicit command to add a rule to the ruletree, and/or the rules engine can add a rule to the ruletree based on an action that is codified in a rule. Similarly, the rules engine can take in an explicit command to remove a rule from the ruletree, and/or the rules engine can remove a rule from the ruletree based on an action that is codified in a rule. In many cases, the firing of one rule precipitates the firing of many actions, any of which can be in the form of further rules or actions to fire.

Returning to the discussion of the back end 280, a query handler 262 can take in a query, parse the query, and access one or more databases based on the parsing of the query. Results of the query are formatted as needed (e.g., as may be specified by the requestor), and delivered to the caller in the form of query results. A query might be raised by a user interacting with the front end, or a query might be raised as a result of processing within the rules engine (as shown).

The generator 264 can receive a generate command, and upon detection of such a generate command, the generator retrieves or accepts the then-current ruletree. The ruletree is traversed to form a list-oriented data structure, where the ordering of items in the list-oriented structure become the order of items (e.g., passages, paragraphs, sections, etc.) in the output target document. As shown, the generator 264 includes a step to map entries in the list to passages (e.g., in the order of the list). In some cases a passage comprises a field or variable to which is assigned a value. In most cases, the aforementioned value is included in a field or other data structure within a rule. Codification of rules, fields, values ordering etc. are given in FIG. 3.

As aforementioned, the rules engine can take in explicit commands to add and/or remove a rule to/from the ruletree. Such commands can be specified using any known techniques (e.g., calling a method, sending a message, posting a value, etc.). One possible partitioning of a rules engine is given as pertains to FIG. 2B.

Figure 2B:
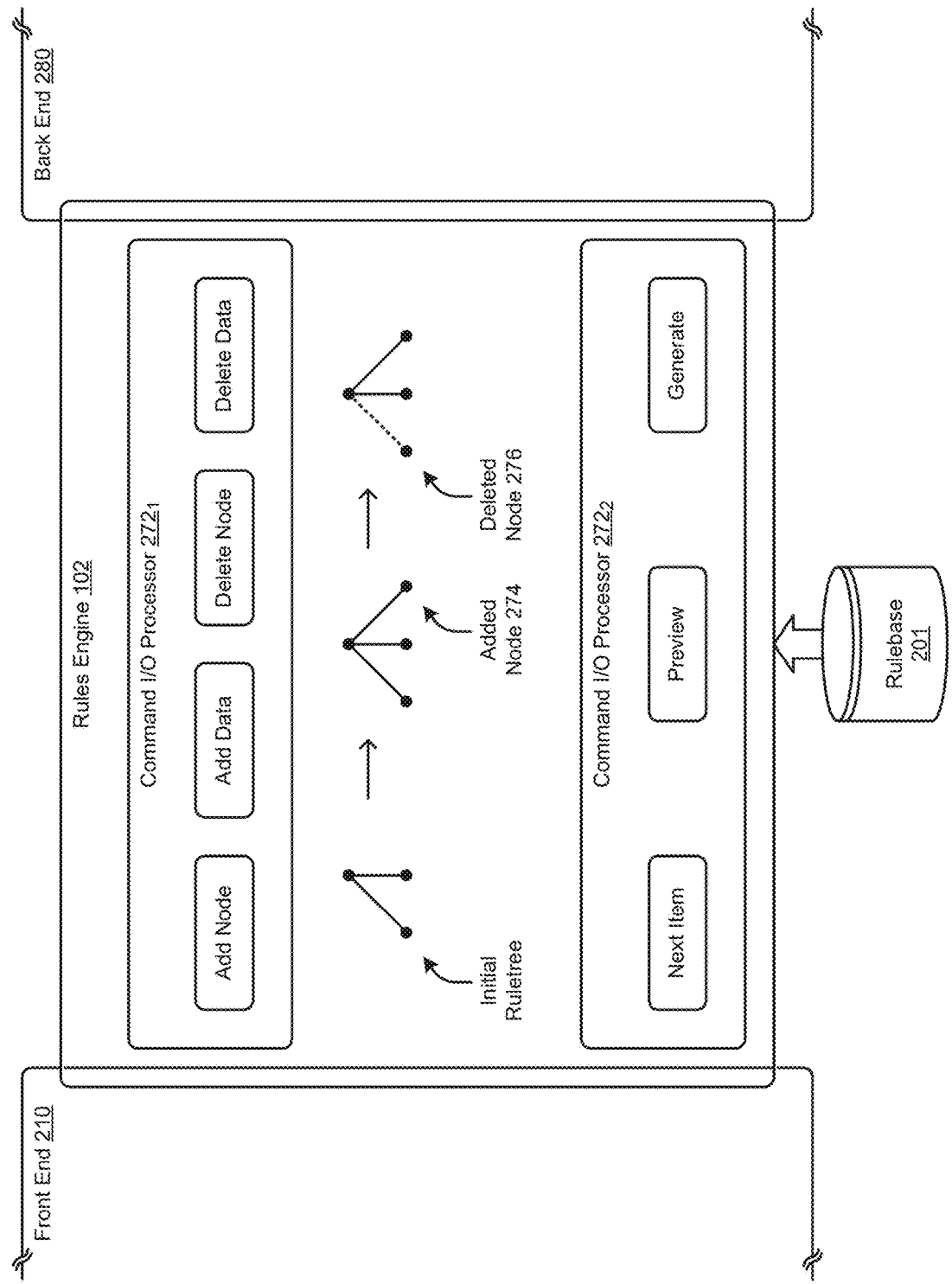
FIG. 2B is a schematic depiction of operations performed by a rules engine during management of a systolic ruletree during computer-aided generation of a target output document, according to an embodiment.

FIG. 2B is a schematic depiction of operations performed by a rules engine during management of a systolic ruletree during computer-aided generation of a target output document. As an option, one or more variations of the rules engine 102 or any aspect thereof may be implemented in the context of the architecture and functionality of the embodiments described herein. The rules engine or any aspect thereof may be implemented in any environment.

The embodiment shown in FIG. 2B is merely one example. As shown, the rules engine includes command I/O processors (e.g., command I/O processor $272_1$, and command I/O processor $272_2$). The command I/O processors in turn process incoming commands and produce outgoing data. This particular example depicts an initial ruletree which is then subjected to a command to "Add Node". The "Add Node" command is processed, resulting in added node 274. The example also depicts the rules engine response to a "Delete Node" command. A node specified in or corresponding to the "Delete Node" command is deleted, resulting in the ruletree that no longer comprises the deleted node 276.

Additional commands are supported. As shown, the rules engine can perform actions pertaining to the semantics of, "Add Data", Delete Data", "Next Item", "Preview", and "Generate". The semantics of the foregoing are implied by their names, and/or are discussed in further detail herein.

Figure 3:
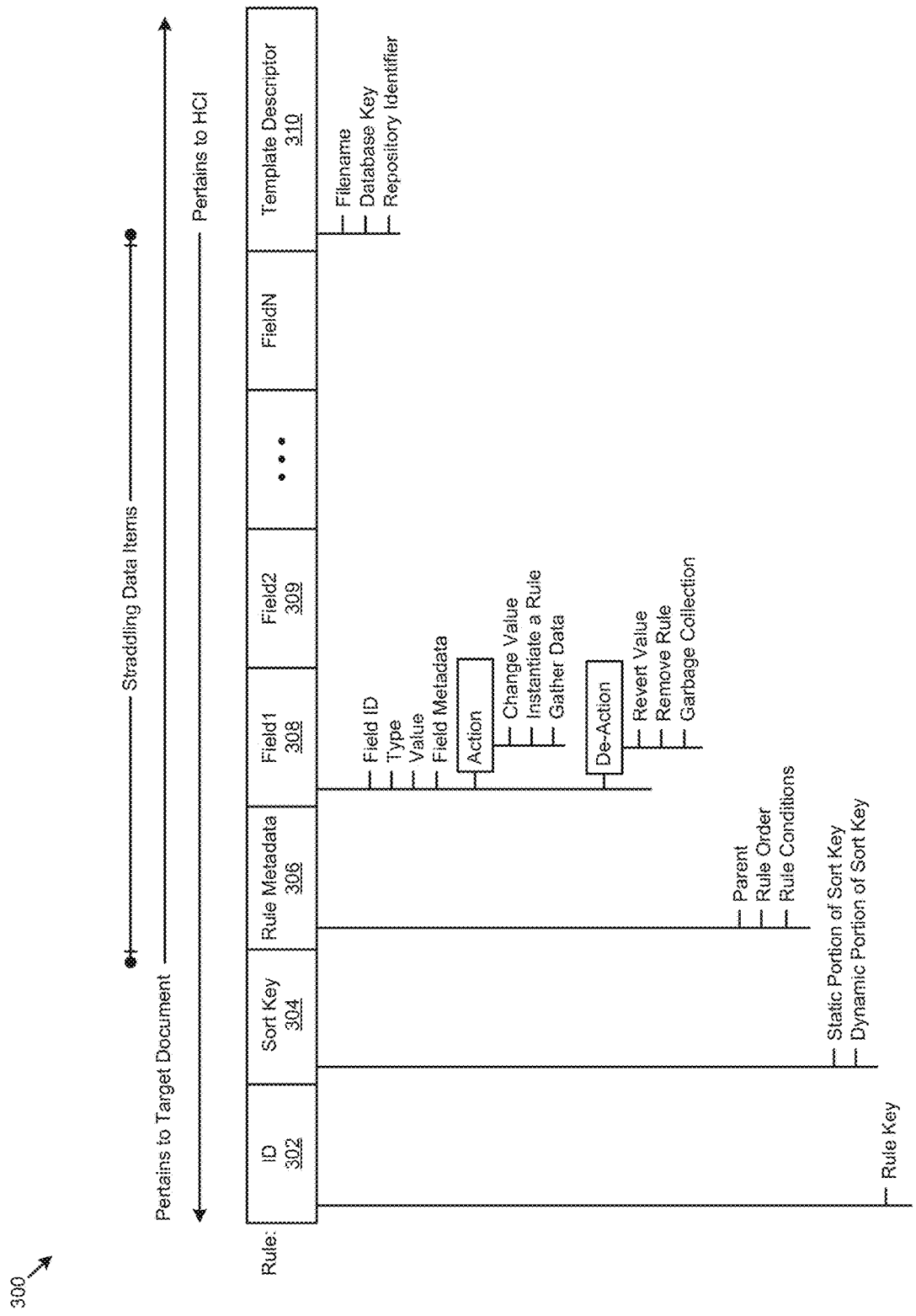
FIG. 3 depicts a rule data structure as used during management of a systolic ruletree during computer-aided generation of a target output document, according to an embodiment.

FIG. 3 depicts a rule data structure 300 as used during management of a systolic ruletree during computer-aided generation of a target output document. As an option, one or more variations of rule data structure 300 or any aspect thereof may be implemented in the context of the architecture and functionality of the embodiments described herein. The rule data structure 300 or any aspect thereof may be implemented in any environment.

The embodiment shown in FIG. 3 is merely one example. As shown, the rule data structure is composed of a series of data items, namely an ID 302, a multipart sort key 304, rule metadata 306, any number of field data entries (e.g., field1 308, field2 309, etc.), and a template descriptor 310. Any constituent data item may or may not contain a value. In some cases a constituent data item may itself be composed of further constituent data items. Further, in some cases, a constituent data item may be hierarchically organized and/or composed of further constituent data items (e.g., the "Action" data item and the "De-Action" data item).

Figure 4:
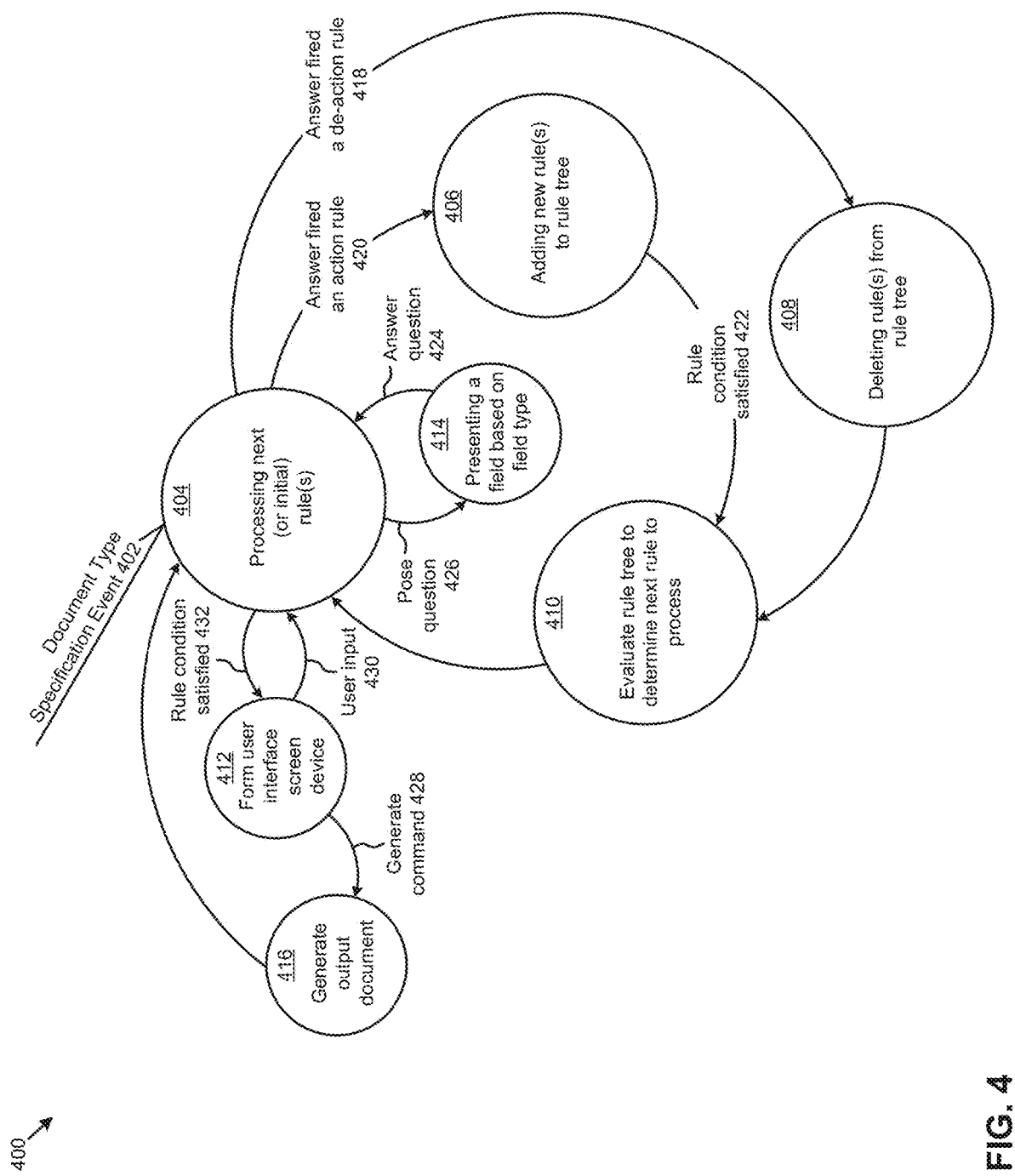
FIG. 4 presents a state diagram showing rule engine state transitions as encountered during management of a systolic ruletree during computer-aided generation of a target output document, according to an embodiment.

FIG. 4 presents a state diagram showing rule engine state transitions 400 as encountered during management of a systolic ruletree during computer-aided generation of a target output document. As an option, one or more variations of rule engine state transitions 400 or any aspect thereof may be implemented in the context of the architecture and functionality of the embodiments described herein. The rule engine state transitions 400 or any aspect thereof may be implemented in any environment.

An asynchronous event, namely the shown document type specification event 402 causes a state transition into state 404 for processing a next rule. The next rule might be an initial rule found at the root of the ruletree. Processing such a rule often poses a question (e.g., in the form of a text string) which then transitions into state 414 for presenting an input field based on a field type. Referring back to FIG. 3, a field (e.g., field1 308) can contain a field ID, a field type, a field value, and possibly other field metadata. A field data item can also contain an action data item and/or a de-action data item, either of which can further contain actions (e.g., change value, instantiate a rule, gather data, etc.) and/or de-actions (e.g., revert value, remove rule, perform garbage collection, etc.).

Processing in state 414 can be based on any interactions between the GIU and a user. In the shown example, state 414 returns to state 404 when the posed question or another question is answered. Additional processing may take place in state 404, upon which processing state 404 might be transitioned to state 406 (see transition 420), or to state 408 (see transition 418). In exemplary cases, entry into state 406 would add one or more new rules to the ruletree. State 406 can move to state 410 when one or more rule conditions are satisfied (see transition 422). In some cases, a rule condition or rule conditions are self-satisfied (e.g., condition=If (TRUE)).

When state 410 is entered, a set of next rules are considered for next processing. Any particular rule can hold a rule order in the rule's corresponding rule metadata. Processing in state 410 examines the rule order value for any number of to-be-processed rules to make a determination of the next rule to process. Upon making such a determination, state 410 transitions back to state 404 where the next rule is processed.

In cases when state 408 is entered from state 404, such as when an answer fired a de-action rule, then state 408 will process the de-action items. As earlier mentioned, processing a de-action can have the effect of reverting to a previous data value, and/or removing a rule, and/or initiating garbage collection. State 408 transitions to state 410, which in turn transitions to state 404.

In some cases, processing a next rule such as in state 404 can merely set up a question/answer pattern, such as is given by transition 426 and transition 424. However, in some situations that are defined by satisfaction of extant rule conditions, processing a next rule can precipitate formation of a new user interface screen. Such a transition 432 and the resulting user input (see transition 430) can cycle back to state 404. However, in some situations, there are no more rules remaining to process and/or the user wants to exit the interview and generate an output document. In such conditions, state 412 moves to state 416. Although there are many possible transitions out of state 412, the example of FIG. 4 shows the exemplary case of transitioning out of state 412 to state 416 upon the occurrence of a generate command (see transition 428). State 416 serves to generate an output document, after which generation the state machine transitions to state 404, which might in turn transition to state 414 for presenting a question until the question is answered, which answer might be a document type specification, thus beginning the cycle anew.

FIG. 5 depicts an example schema 500 as used by a rules engine during management of a systolic ruletree during computer-aided generation of a target output document. As an option, one or more variations of example schema 500 or any aspect thereof may be implemented in the context of the architecture and functionality of the embodiments described herein. The example schema 500 or any aspect thereof may be implemented in any environment.

The embodiment shown in FIG. 5 is a Javascript code representation of a schema used for rules. Among other attributes codified in the Javascript, this example includes a "questionGroup" definition. As shown, the "questionGroup" definition includes an interaction identifier 502 (see string 'Rejection Of Claims Under 35 USC 101'), a parent indication 504, and a portion of a sort key. In this particular "questionGroup", the sort key comprises only a static portion of sort key 506. A dynamically added portion of a sort key is calculated at runtime. In this particular case, the "questionGroup" schema also includes a set of questions in a question list. A question can be posed in combination with any of a variety of interactive screen devices (e.g., text boxes, checkboxes, radio buttons, dropdown or pulldown menus, etc.). As shown the first question of the question list includes an interaction screen device 508 that is specified as having a numeric input type.

A rule in accordance with this and other possible schemas might include one or more actions and/or one or more de-actions. As shown, this rule includes a single action in the form of a rule addition instruction 510 as well as a single de-action in the form of a rule deletion instruction 512.

Returning to the discussion of the rule sort key, the values of sort keys are carried by a rule, which in turn is the basic unit of a node in a ruletree. The sort key is used during document generation to generate the passages of the target document in an order that had been defined during the course of constructing the interview. As earlier discussed, since neither the ordered flow of the output document nor the ordered flow of the interview process can be known before the interview process begins, the ordered flow of the output document is a consequence of traversing through the rule engine state transitions 400 during user interaction with the GUI. Accordingly, embodiments rely in part on a target document component ordering technique for determining an order of passages in the target output document based on the particular construction of the ruletree at the time of document generation. Since the ruletree is systolic—undergoing expansion and contraction during interactions—the ordering of sort keys and respective passages changes with each expansion and contraction.

Figure 6:
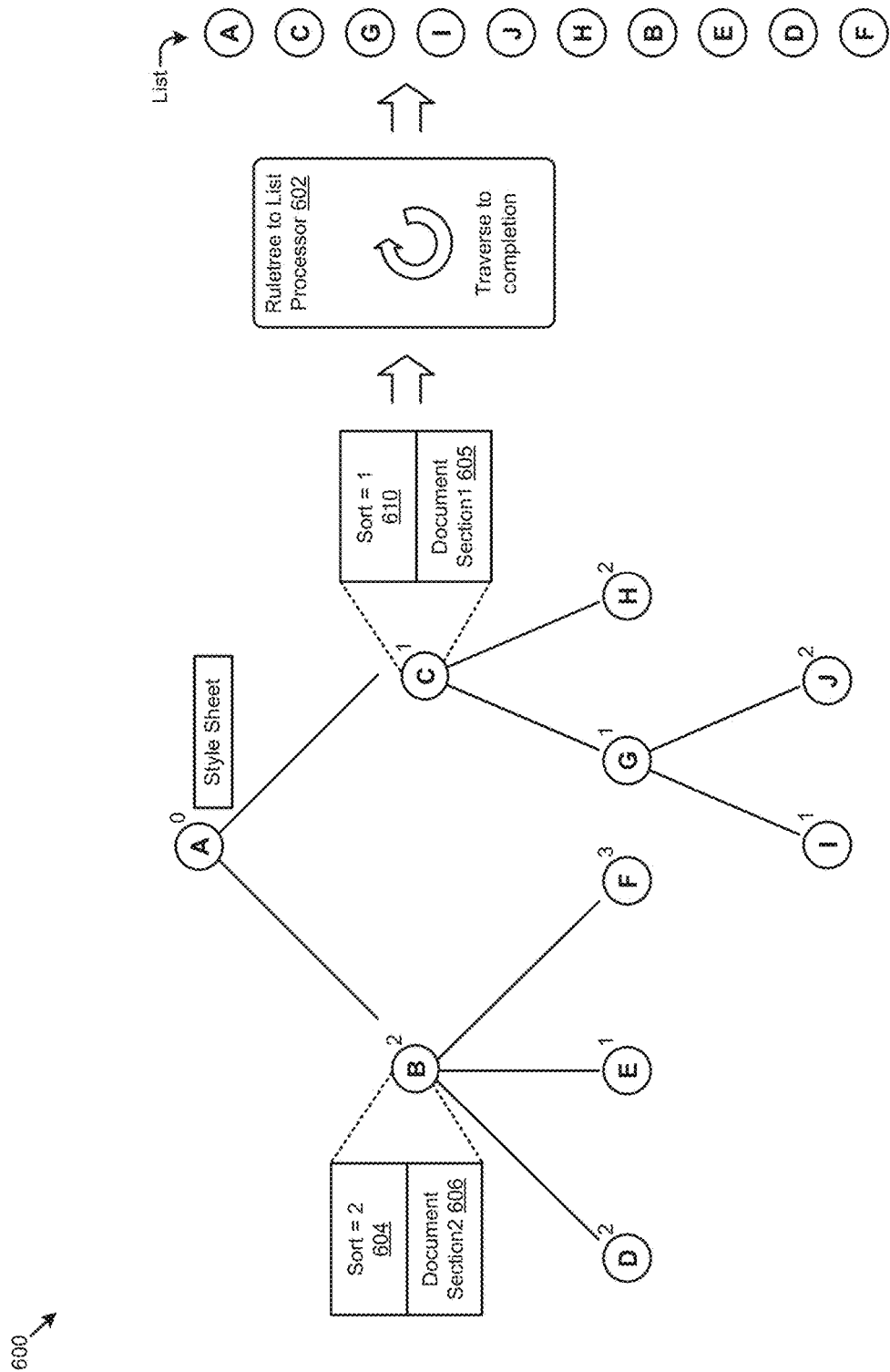
FIG. 6 depicts a target document component ordering technique as used by a list processor during computer-aided generation of a target output document, according to an embodiment.

FIG. 6 depicts a target document component ordering technique 600 as used by a list processor during computer-aided generation of a target output document. As an option, one or more variations of target document component ordering technique 600 or any aspect thereof may be implemented in the context of the architecture and functionality of the embodiments described herein. The target document component ordering technique 600 or any aspect thereof may be implemented in any environment.

The embodiment shown in FIG. 6 is merely one example. As shown, the target document component ordering technique is implemented in part by a ruletree to list processor 602. The list processor 602 takes as input a ruletree. One characteristics of such a ruletree is that a node can have any number of child nodes, and so on recursively. The children within a tree are not maintained in sort key order, rather the child nodes are merely added to the tree together with their rule data items (or reference thereto). At the time of document generation, the list processor 602 is invoked and the ruletree is traversed. During traversal, the following list processing rules are observed: (1) a selected branch is traversed depth-first to a leaf node; (2) when there are two or more child nodes at a particular level, the node having the lowest sort key (e.g., sort key 604, sort key 610) is traversed first among the siblings; and (3) once, and once only, upon traversal of any node (e.g., see node pertaining to document section1 605, see node pertaining to document section2 606), document construction information from that node is written to the list.

Figure 7:
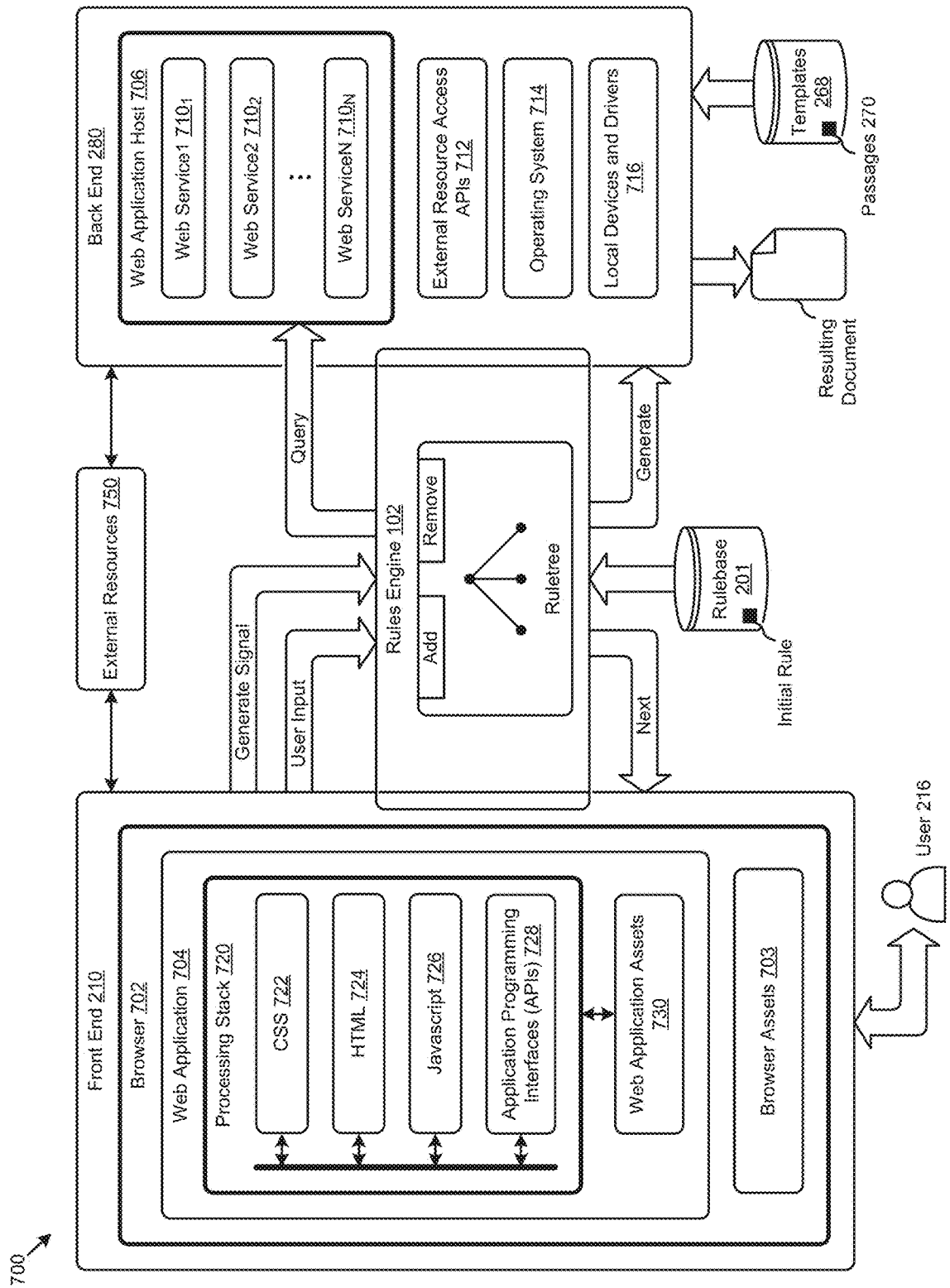
FIG. 7 depicts a deployment environment for a client-server web application implementation of systolic ruletree management during computer-aided generation of a target output document, according to an embodiment.

FIG. 7 depicts a deployment environment 700 for a client-server web application implementation of systolic ruletree management during computer-aided generation of a target output document. As an option, one or more variations of deployment environment 700 or any aspect thereof may be implemented in the context of the architecture and functionality of the embodiments described herein. The deployment environment 700 or any aspect thereof may be implemented in any environment.

The embodiment shown in FIG. 7 is merely one example. As shown, the front end 210 comprises a browser 702, and the back end 280 comprises a web application host 706. The web application host supports any number of web services (e.g., web service1 $710_1$, web service2 $710_2$, . . . , web serviceN $710_N$). The web services can use any variations of external resource application programming interfaces 712 and/or any portions of an operating system 714, possibly including any variations of local devices and drivers 716.

The browser receives a web application 704 from the back end and commences to execute the web application. In example embodiments, the web application includes a processing stack 720 which uses any combination of CSS 722, HTML 724, Javascript 726, and any arbitrary set of application programming interfaces 728 (that may or may not overlap with the external resource application programming interfaces 712). The processing stack 720 has access to web application assets 730, and the browser has access to browser assets 703.

In some embodiments, the front end 210 and the back end 280 are hosted on the same computing platform. In other situations, the front end 210 and the back end 280 are hosted on different computing platforms and communicate over a network (e.g., using http protocols). External resources 750 can be made available (e.g., over http protocols or over intra-platform communication mechanisms).

Figure 8A:
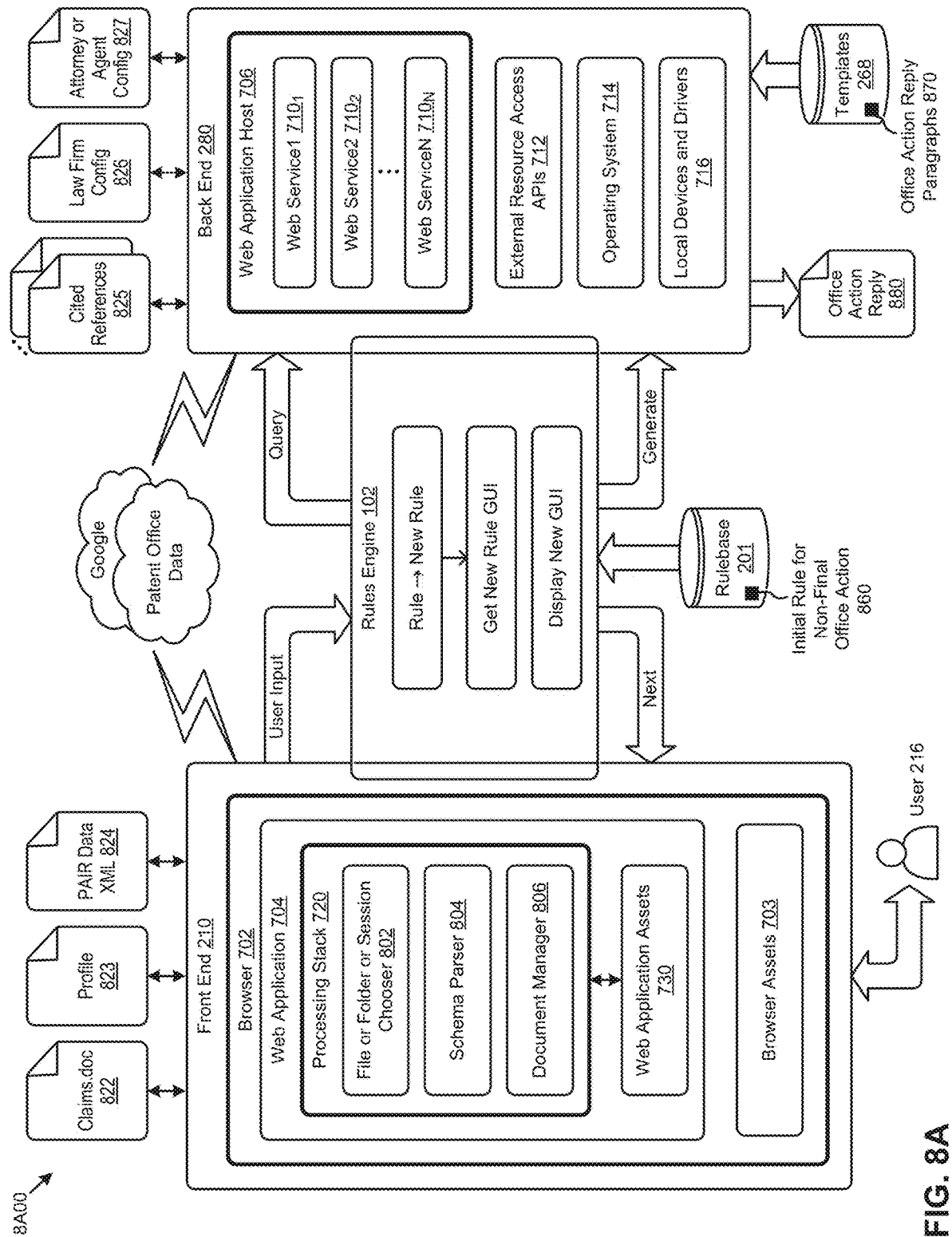
FIG. 8A depicts a systolic ruletree management technique as used for automatic generation of a reply to a USPTO office action, according to an embodiment.

FIG. 8A depicts a systolic ruletree management technique 8A00 as used for automatic generation of a reply to a USPTO office action. As an option, one or more variations of systolic ruletree management technique 8A00 or any aspect thereof may be implemented in the context of the architecture and functionality of the embodiments described herein. The systolic ruletree management technique 8A00 or any aspect thereof may be implemented in any environment.

As shown, the systolic ruletree management technique is applied to development of a reply to a USPTO office action. In this case, with the aforementioned target document being an office action reply 880, the templates 268 comprise office action reply paragraphs 870. Using local data access techniques and/or LAN data access techniques and/or WAN data access techniques, the back end can retrieve any of various data The front end can also retrieve data from local or external repositories. As examples, the front end might use a file or folder or session chooser 802 to navigate to a location where the claims are stored (e.g., in a "claims.doc" document 822). The front end might retrieve other information from a user or other sort of profile 823. Further, the front end, with or without assistance from the back end, can access patent application information retrieval (PAIR) data that is coded in XML in accordance with a schema. Such PAIR data XML 824 can be parsed by a schema parser 804. The web application of the front end might interact with the back end to tag, store, and retrieve any sets of documents, including any of the aforementioned data items, as well as any forms of file access history or session data. A document manager 806 performs processing to tag, store, and retrieve any sets of documents. The document manager can be implemented as a part of a web application, and in turn a web application can use an HCI screen.

For development of a reply to a USPTO office action, a document type specification might be "Reply to OA" and the rulebase 201 might comprise an initial rule for non-final office action 860. To receive a user indication of a particular document type specification, an HCI screen such as FIG. 8B might be presented.

Figure 8B:
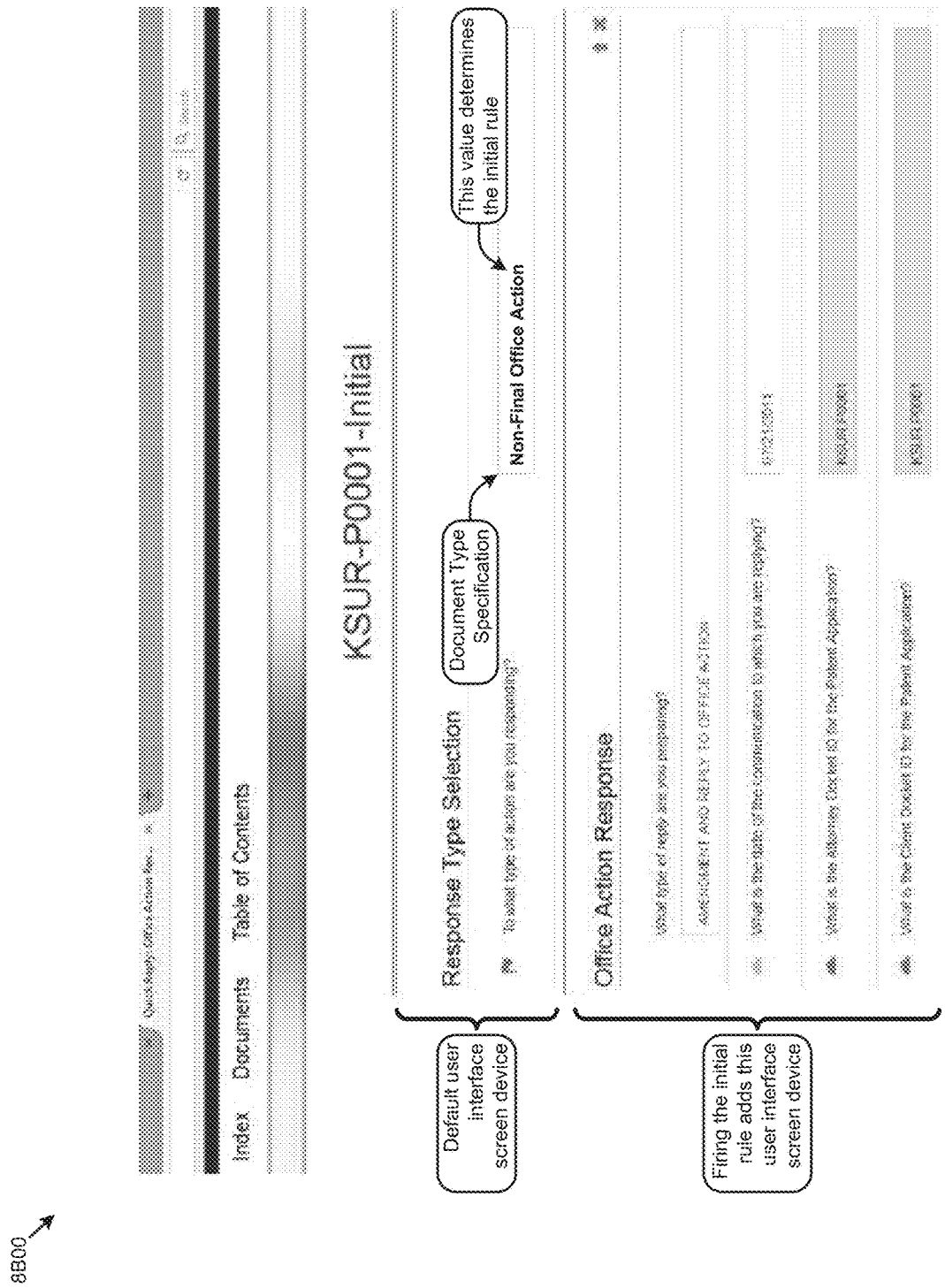
FIG. 8B depicts a document type specification screen as used for rulebase-defined generation of a reply to a USPTO office action, according to an embodiment.

FIG. 8B depicts a document type specification screen 8B00 as used for rulebase-defined generation of a reply to a USPTO office action. As an option, one or more variations of document type specification screen 8B00 or any aspect thereof may be implemented in the context of the architecture and functionality of the embodiments described herein. The document type specification screen 8B00 or any aspect thereof may be implemented in any environment.

As shown the document type specification is given in a text box comprising the input string "Non-Final Office Action". In this example, the document type specification determines an initial rule for the root of the ruletree, the initial rule corresponding to a rule pertaining to a "Non-Final Office Action". Firing the initial rule adds additional screen devices, as shown.

Figure 8C:
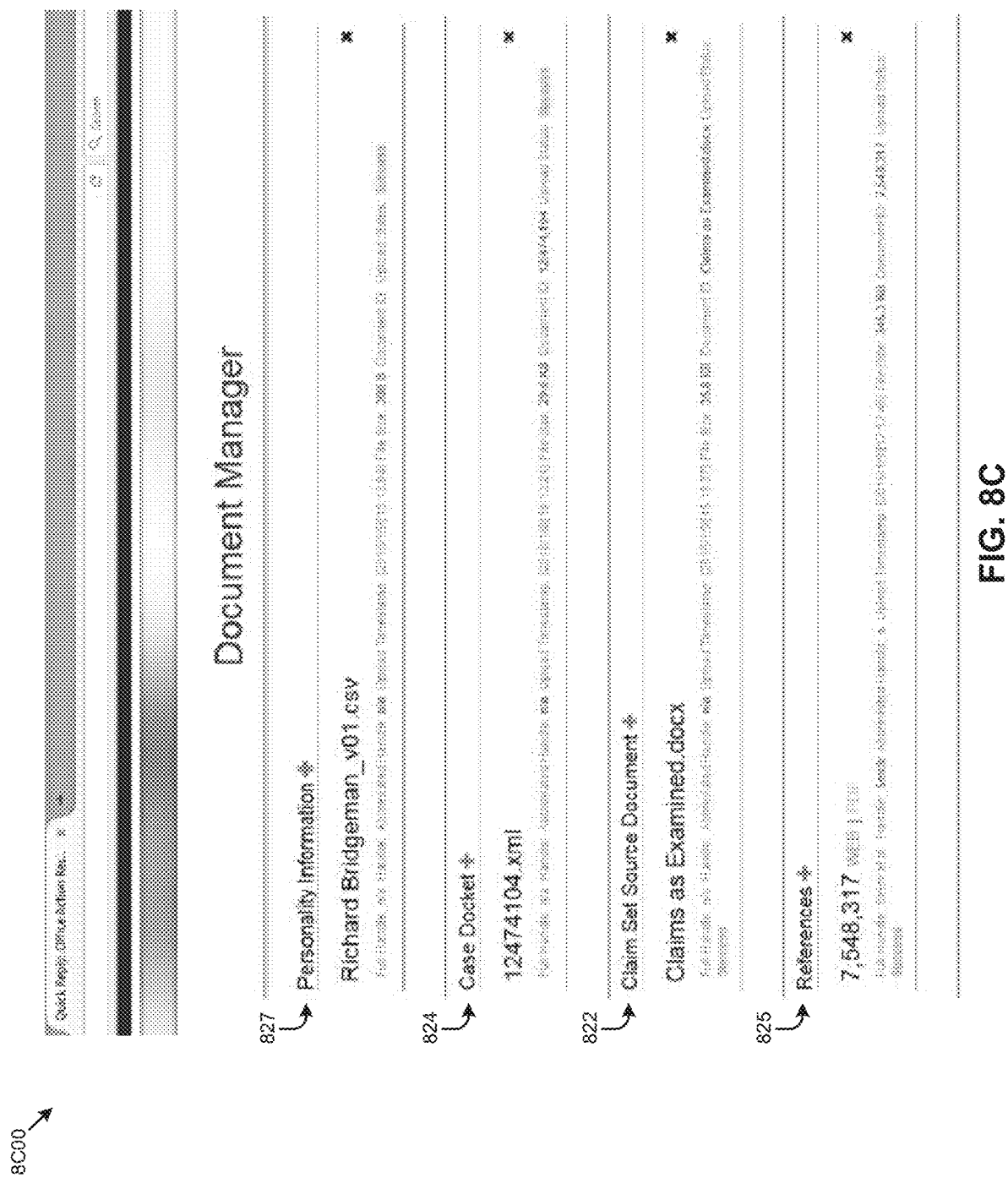
FIG. 8C depicts a document manager HCI screen as used for rulebase-defined generation of a reply to a USPTO office action, according to an embodiment.

FIG. 8C depicts a document manager HCI screen 8C00 as used for rulebase-defined generation of a reply to a USPTO office action. As an option, one or more variations of document manager HCI screen 8C00 or any aspect thereof may be implemented in the context of the architecture and functionality of the embodiments described herein. The document manager HCI screen 8C00 or any aspect thereof may be implemented in any environment.

In this example, the retrieved data is shown as attorney or agent information 827 (e.g., attorney or agent name and registration number, contact information, etc.) and law firm configuration data 826 (e.g., law firm address, customer number, USPTO deposit account number, etc.), which can be retrieved at any moment in time. The data retrieved by the back end might also comprise cited references 825 (e.g., by U.S. patent number, by U.S. patent application publication number, by URL to a published paper, or by URL to a WIPO publication, etc.). Access to such cited references 825 can be through any one or more external resource sites such as at the patent office via "www.uspto.gov" or such as via Google via "google.com/patents", etc.

Figure 8D:
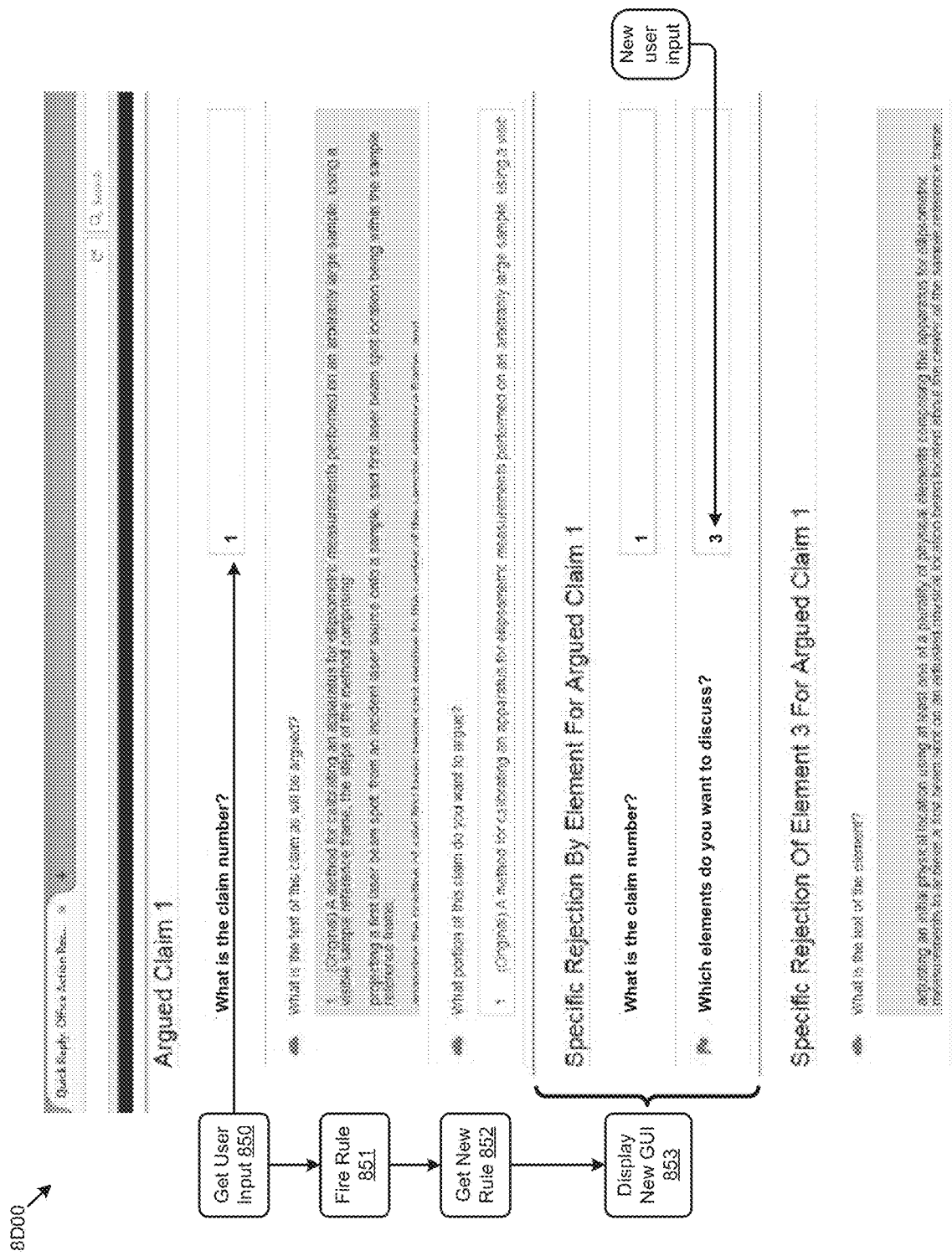
FIG. 8D depicts a user interaction technique as used for managing systolic ruletree expansion during computer-aided generation of a target output document, according to an embodiment.

FIG. 8D depicts a user interaction technique 8D00 as used for managing systolic ruletree expansion during computer-aided generation of a target output document. As an option, one or more variations of user interaction technique 8D00 or any aspect thereof may be implemented in the context of the architecture and functionality of the embodiments described herein. The user interaction technique 8D00 or any aspect thereof may be implemented in any environment.

The embodiment shows several steps that are executed by the front end and/or back end and/or any portions of the rule processor. The steps are depicted near corresponding characteristics of an HCI screen. Specifically, step 850 serves to get user input from a text box, step 851 serves to file a rule based on that data item, step 852 serves to get a new rule (e.g., based on the firing of the previous rule), and step 853 serves to display new GUI elements.

Figure 8E:
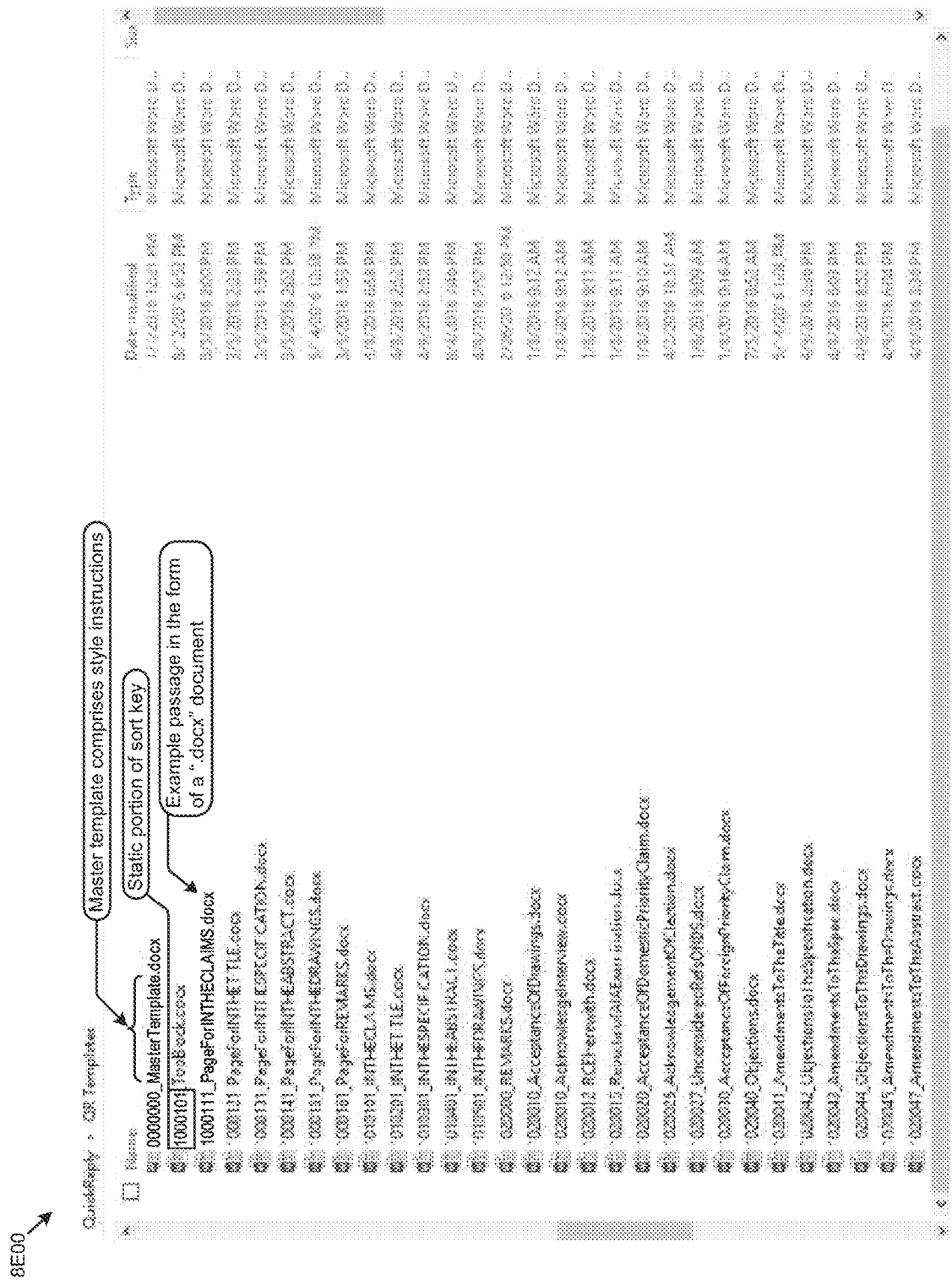
FIG. 8E presents a sorted list of document passages as used in systems for automatic generation of a reply to a USPTO office action, according to an embodiment.

FIG. 8E presents a sorted list of document passages 8E00 as used in systems for automatic generation of a reply to a USPTO office action. As an option, one or more variations of document passages 8E00 or any aspect thereof may be implemented in the context of the architecture and functionality of the embodiments described herein. The document passages 8E00 or any aspect thereof may be implemented in any environment.

The embodiment shown depicts a list of files in sort key order. More specifically, the file names are prepended with the aforementioned static portion of the sort key. The file set shown also includes a master template (e.g., "0000000_Mastertemplate.docx". The files contain passages that form portions of the target output document, specifically an office action reply.

Figure 8F:
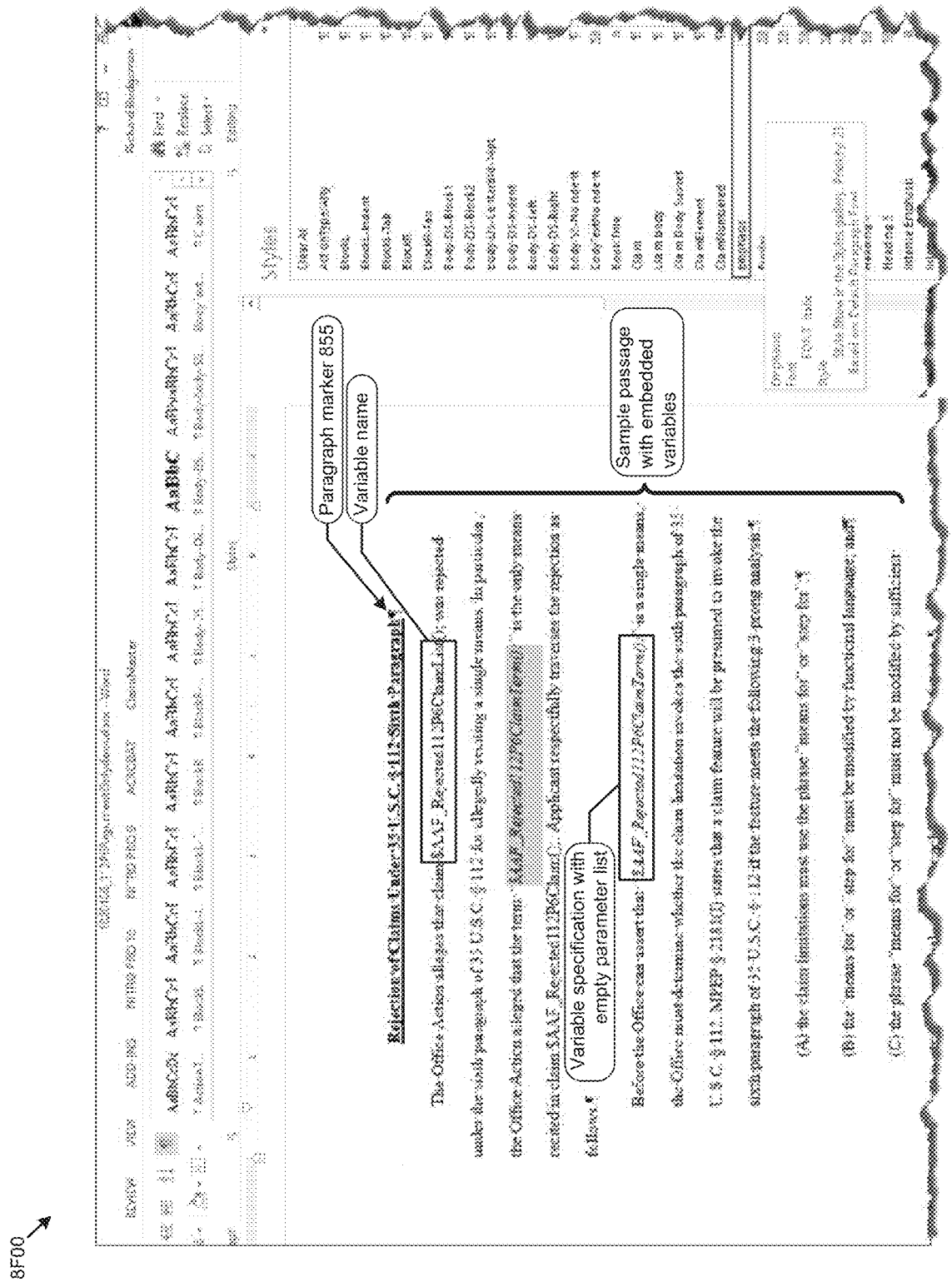
FIG. 8F presents an example of embedded variables within document passages as used in systems for rulebase-defined generation of a reply to a USPTO office action, according to an embodiment.

Some of the passages contain variables, examples of which are shown and discussed as pertains to FIG. 8F.

FIG. 8F presents an example of embedded variables within document passages 8F00 as used in systems for rulebase-defined generation of a reply to a USPTO office action. As an option, one or more variations of embedded variables within document passages 8F00 or any aspect thereof may be implemented in the context of the architecture and functionality of the embodiments described herein. The embedded variables within document passages 8F00 or any aspect thereof may be implemented in any environment.

The embodiment shows a variable name "$AAF_Rejected112P6ClaimList" with an optional parenthesized parameter list. A parenthesized parameter list may contain parameters (e.g., variables or constants, or pointers) that include instructions as to formatting of the value corresponding to the outputted version of the variable name's value. Examples include formatting as italicized text, formatting as bolded text, suppressing output of the value completely, suppressing output of the value plus suppressing any paragraph marker 855 that follows the variable in a passage, etc.

Figure 8G:
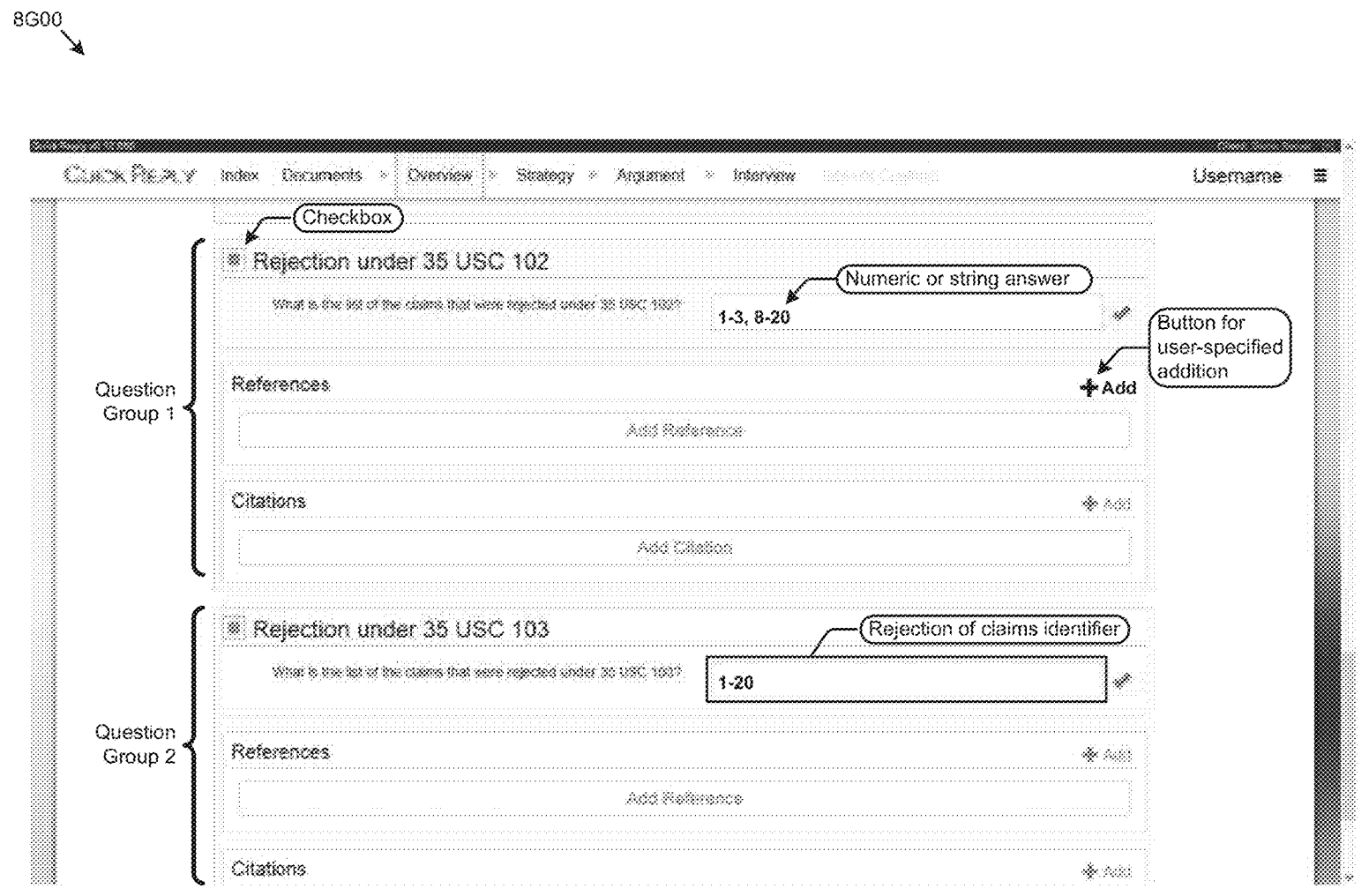

FIG. 8G presents a dynamically-generated question group 8G00 as used in systems that perform computer-aided generation of a target output document based on a systolic ruletree. As an option, one or more variations of question group 8G00 or any aspect thereof may be implemented in the context of the architecture and functionality of the embodiments described herein. The question group 8G00 or any aspect thereof may be implemented in any environment.

The embodiment shows question groups. The first question group (i.e., question group 1) includes a checkbox, a numeric or string answer box, and a button to facilitate a user-specified addition of a rule. The second question group (i.e., question group 2) pertains to "35 USC 103" and includes a text box to capture the listing of the claim or claim range, or claim ranges that were rejected in the office action.

Figure 9A:
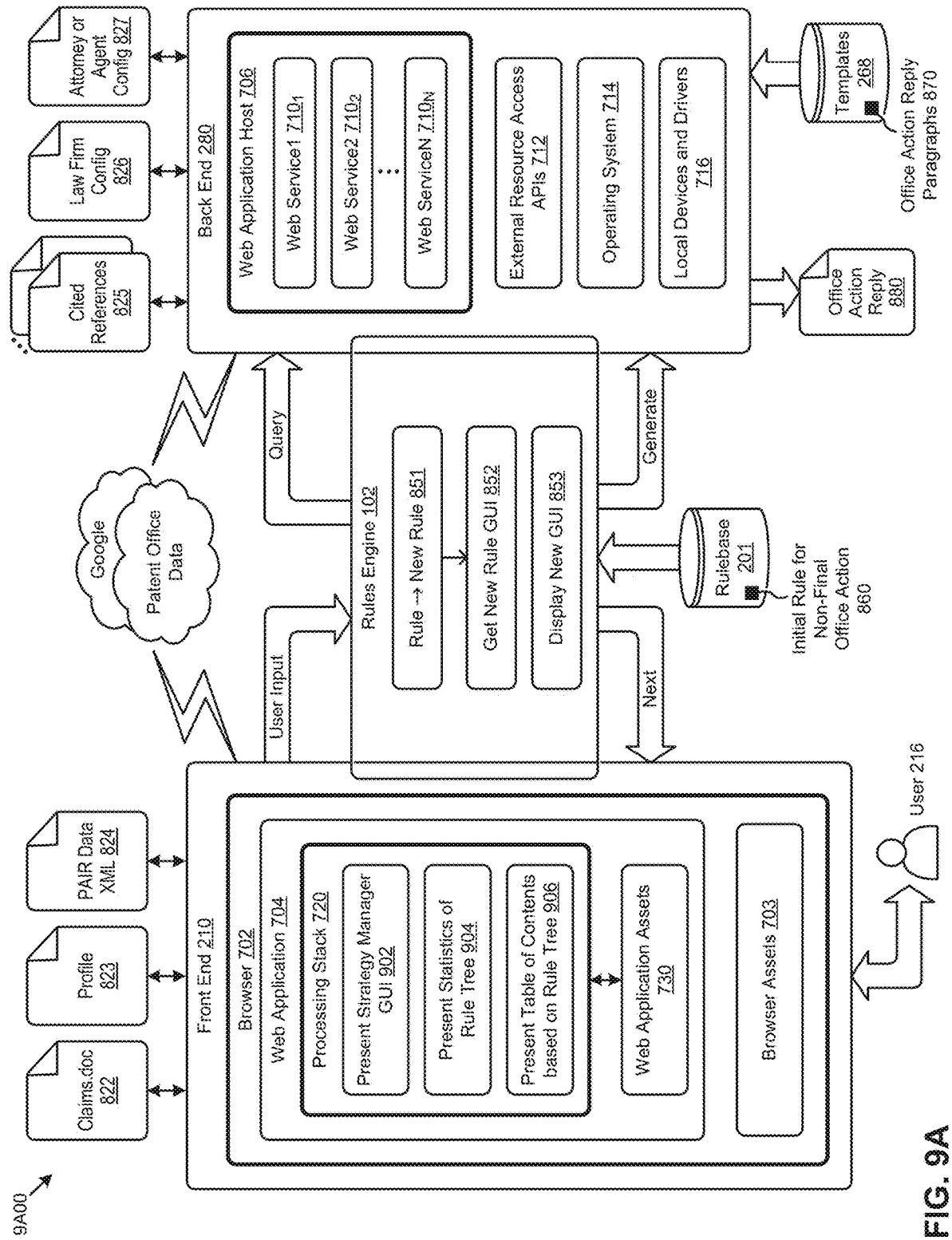
FIG. 9A depicts a web application system to perform target document construction operations prior to invoking computer-aided generation of a target output document from a systolic ruletree, according to an embodiment.

FIG. 9A depicts a web application system 9A00 to perform target document construction operations prior to invoking computer-aided generation of a target output document from a systolic ruletree. As an option, one or more variations of web application system 9A00 or any aspect thereof may be implemented in the context of the architecture and functionality of the embodiments described herein. The web application system 9A00 or any aspect thereof may be implemented in any environment.

The embodiment shown in FIG. 9A depicts an embodiment of processing stack 720 that includes steps for computer-aided construction of an office action reply 880 through use of a strategy manager HCI. As shown, the processing stack 720 includes step 902 to present a strategy manager GUI. An example of such a strategy manager GUI is given as pertains to FIG. 9B. The strategy manager GUI. Presents new screen devices based on previous answers. More specifically, screen devices presented in the strategy manager GUI are presented based on the occurrence of a rule in the ruletree. Rules in the ruletree that pertain to the formation of a strategy manager GUI would be present based on previously asked and answered questions.

One presentation of a ruletree depicts a set of statistics (step 904) that are calculated over the entries in the ruletree. The statistics pertain to an accounting of questions in the ruletree that have been answered as well as an accounting of questions in the ruletree that have not been answered. In some embodiments, questions in the ruletree that have been answered automatically (e.g., through OCR or other parsing of the office action, through parsing or other application of PAIR data, etc.) are deemed as having been answered. In some embodiments, questions in the ruletree that have been answered automatically (e.g., through OCR or other parsing of the office action, through parsing or other application of PAIR data, etc.) are deemed as not having been answered, at least until the automatically auto-filled answers are confirmed through use of a screen device.

One presentation of a ruletree depicts a set of entries that form sections of the intended target output document (step 906). In some cases the presentation of the sections are formatted as a table of contents (TOC). In some cases, hovering over an entry (e.g., section or paragraph) in such a TOC will cause display of a preview of the corresponding entry.

Figure 9B:
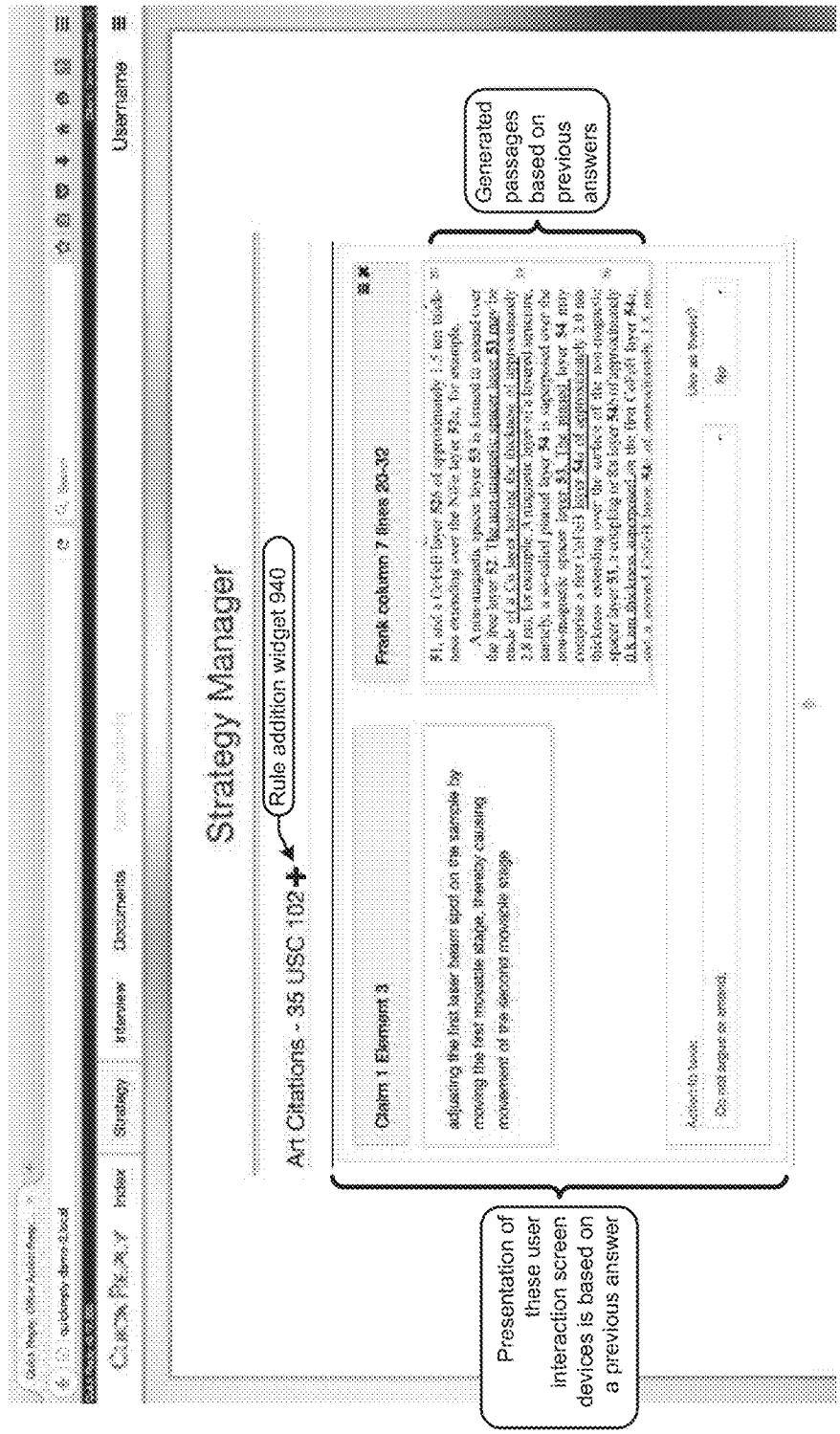
FIG. 9B depicts a strategy manager HCI as used to perform target document construction operations prior to invoking computer-aided generation of a target output document from a systolic ruletree, according to an embodiment.

FIG. 9B depicts a strategy manager HCI 9B00 as used to perform target document construction operations prior to invoking computer-aided generation of a target output document from a systolic ruletree. As an option, one or more variations of strategy manager HCI 9B00 or any aspect thereof may be implemented in the context of the architecture and functionality of the embodiments described herein. The strategy manager HCI 9B00 or any aspect thereof may be implemented in any environment.

The embodiment shown in FIG. 9B is an example that combines presentation of screen devices based on previous answers with presentation of generated passages. The shown generated passages are formed by (1) determining a passage (e.g., a file name) from a field (e.g., a sort key) or fields in the subject instance of a rule, (2) retrieving the passage, (3) parsing the passage to identify variable names, (4) resolving to a value corresponding to the variable name (e.g., resolving to a text or image value), (5) formatting the value (e.g., by adding bolding emphasis or by underlining emphasis, etc.) for presentation in the passage, and (6) loading the passage with its formatted variable values into a screen device for presentation in an HCI.

As shown, "Claim 1 Element 3" is presented in a text box. The text in the text box can be edited (e.g., to add content and/or emphasis, etc.). Also shown is a formatted passage that corresponds to a portion of a cited reference. In this strategy manager, the practitioner can assess an action to take in formulation of the reply. In this case, the cite, "Frank column 7 lines 20-32" appeared to the practitioner to be some sort of clerical or typographical error, and thus the practitioner decided the appropriate action to take is "Do not argue or amend" (as shown). The strategy manager HCI 9B00 includes a rule addition widget 940. The practitioner can use the rule addition widget to explicitly add a rule to the ruletree. More specifically, the practitioner can use the shown rule addition widget to explicitly add an art citation rule to the ruletree.

Figure 9C:
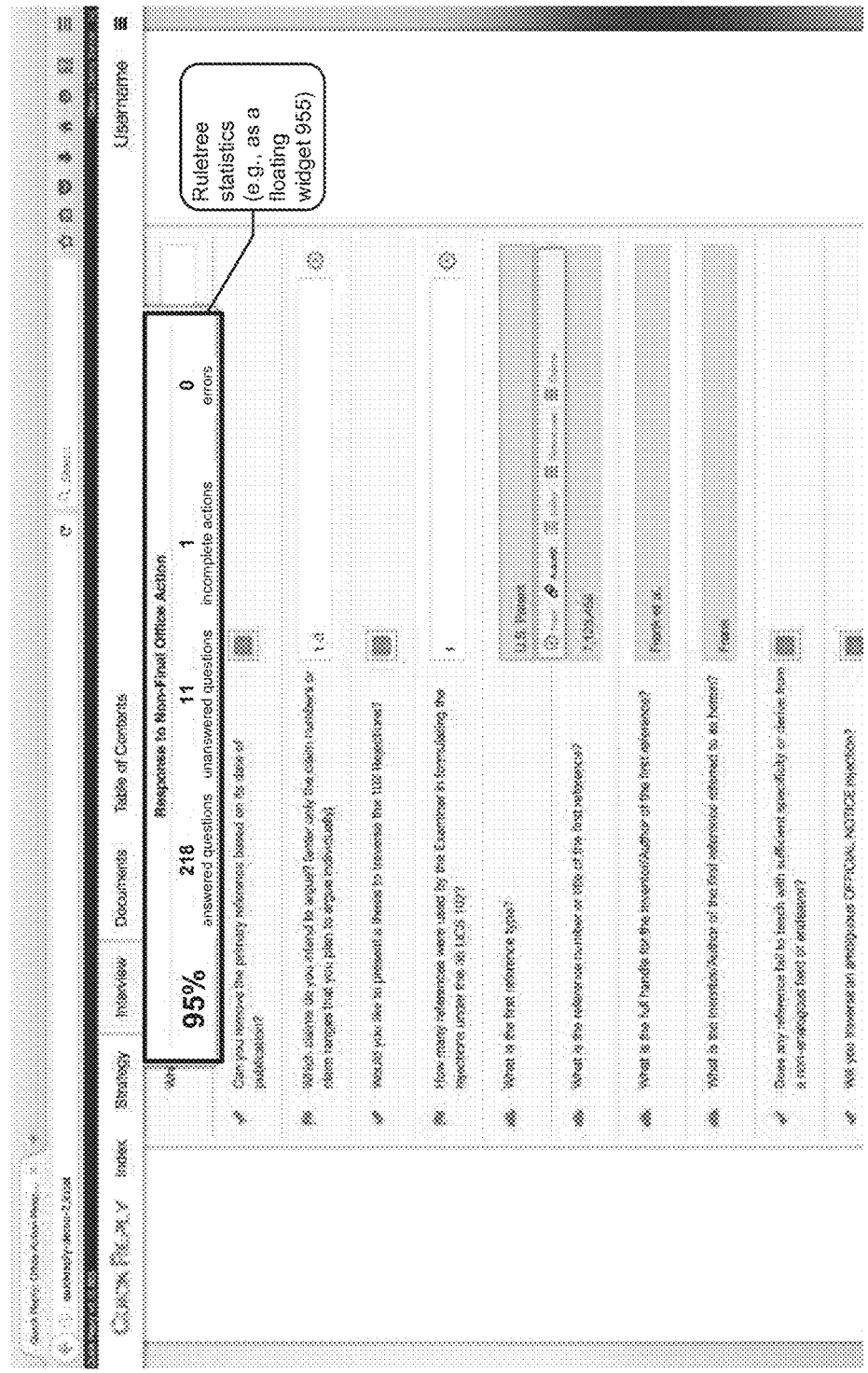
FIG. 9C depicts a ruletree statistics management HCI as used to perform target document construction operations prior to invoking computer-aided generation of a target output document from a systolic ruletree, according to an embodiment.

FIG. 9C depicts a ruletree statistics management HCI 9C00 as used to perform target document construction operations prior to invoking computer-aided generation of a target output document from a systolic ruletree. As an option, one or more variations of ruletree statistics management HCI 9C00 or any aspect thereof may be implemented in the context of the architecture and functionality of the embodiments described herein. The ruletree statistics management HCI 9C00 or any aspect thereof may be implemented in any environment.

Ruletree statistics can be presented in a floating widget 955 (as shown) or as a popup or using any known techniques for presentation of information on an HCI screen. In this example, the interactions is deemed to be 95% complete (e.g., 95% of the questions in the then-current ruletree have been answered). The foregoing statistic comes from the presence of 218 answered questions, 11 unanswered questions, and one as of yet incomplete action).

Figure 9D:
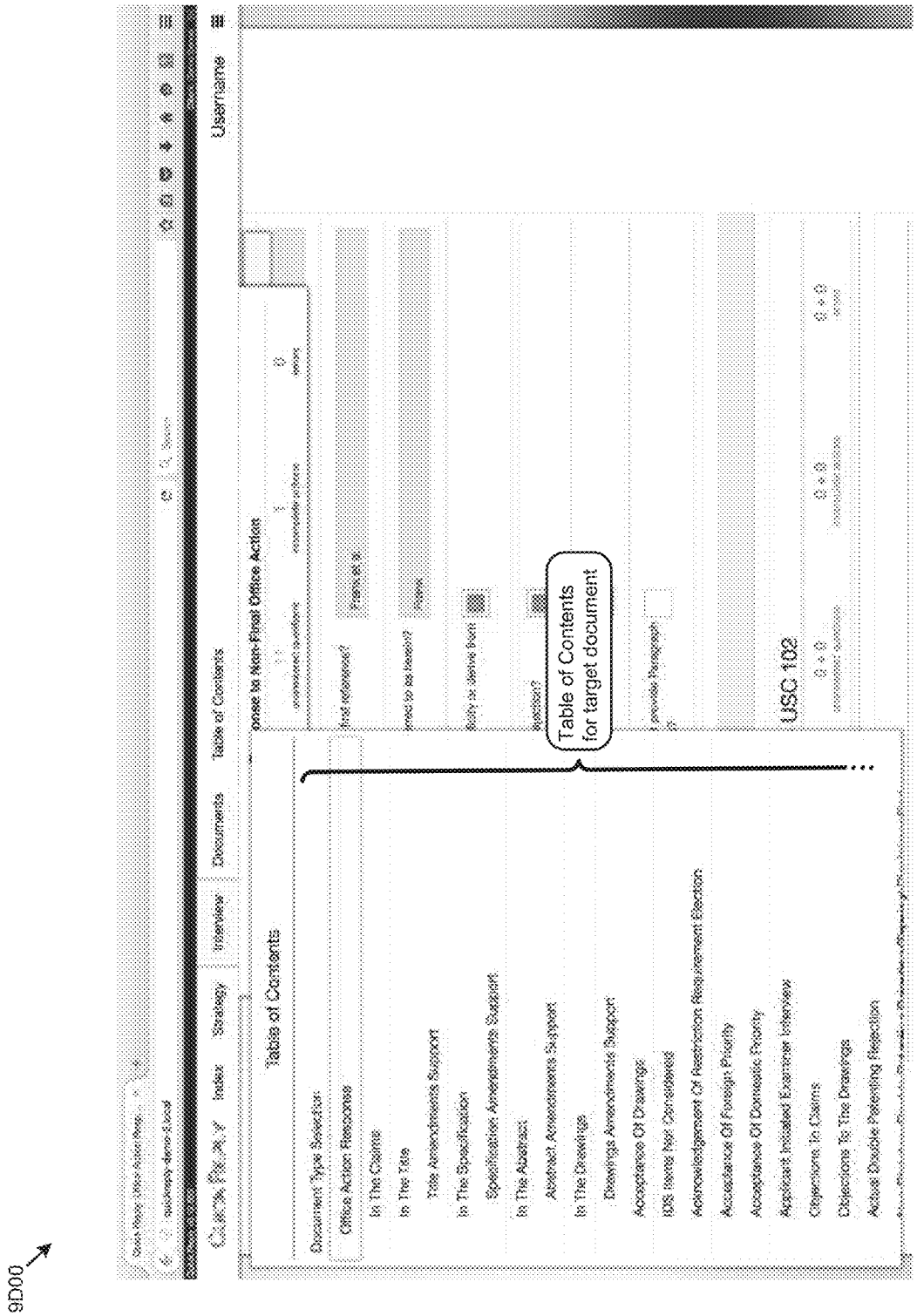
FIG. 9D depicts a table of contents (TOC) presentation screen as used to perform target document construction operations prior to invoking computer-aided generation of a target output document from a systolic ruletree, according to an embodiment.

FIG. 9D depicts a table of contents (TOC) presentation screen 9D00 as used to perform target document construction operations prior to invoking computer-aided generation of a target output document from a systolic ruletree. As an option, one or more variations of TOC presentation screen 9D00 or any aspect thereof may be implemented in the context of the architecture and functionality of the embodiments described herein. The TOC presentation screen 9D00 or any aspect thereof may be implemented in any environment.

Figure 10A:
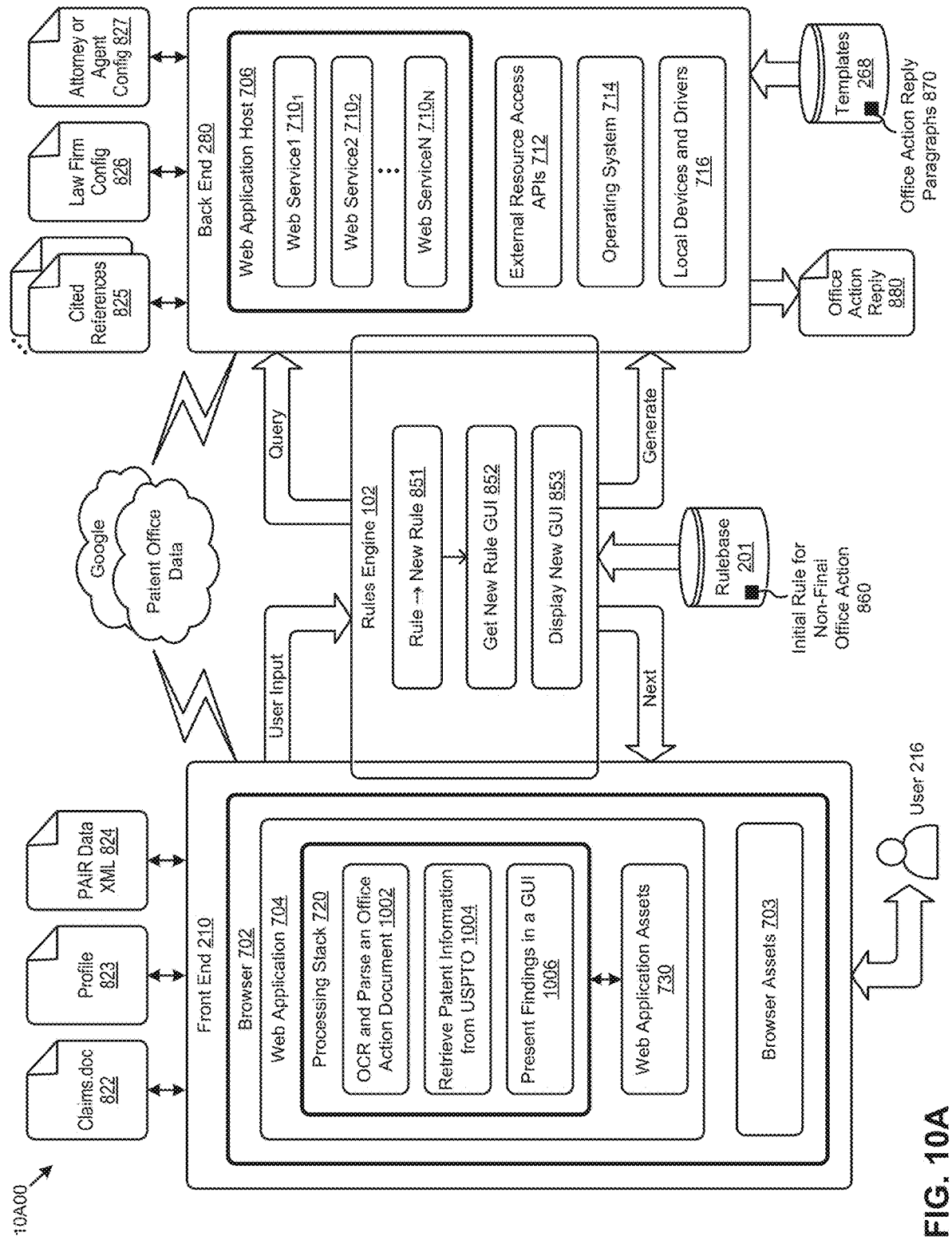
FIG. 10A depicts a web application system to perform input document parsing and making corresponding ruletree operations before performing computer-aided generation of a target output document based, according to an embodiment.

FIG. 10A depicts a web application system 10A00 to perform input document parsing and corresponding ruletree operations before performing computer-aided generation of a target output document based on a systolic ruletree. As an option, one or more variations of web application system 10A00 or any aspect thereof may be implemented in the context of the architecture and functionality of the embodiments described herein. The web application system 10A00 or any aspect thereof may be implemented in any environment.

The embodiment shown in FIG. 10A depicts a set of steps within processing stack 720, where the steps are configured to (1) OCR (if needed) an input document (step 1002), (2) retrieve information from an external source (step 1004), and (3) present findings (step 1006) in an HCI (e.g., in a GUI). The presentation of findings might span multiple pages of a GUI.

Strictly an example flow of step 1002, step 1004, and step 1006, consider the situation where a practitioner is in receipt of a PDF of an office action from the USPTO. The practitioner can upload the PDF, which action causes the PDF to be parsed. In some cases a complete set of and precise information can be garnered from the PDF. However, in some cases, OCR and/or other parsing of the office action PDF might return incomplete or inaccurate results. In many cases, data fields garnered from OCR or parsing can be ratified using another source of data. For example, to validate certain OCR'd or parsed data pertaining to the office action, information retrieved from the USPTO can be used. Strictly as one case, the title of an application might be listed in an office action, and the OCR or parsed version of the title can be compared to the title gathered from other data (e.g., PAIR data, assignment records, etc.) that has been retrieved from the USPTO. A quantitative measure of quality or confidence in the OCR and/or parsing can be calculated by validating (or failing validation) over multiple fields.

Figure 10B:
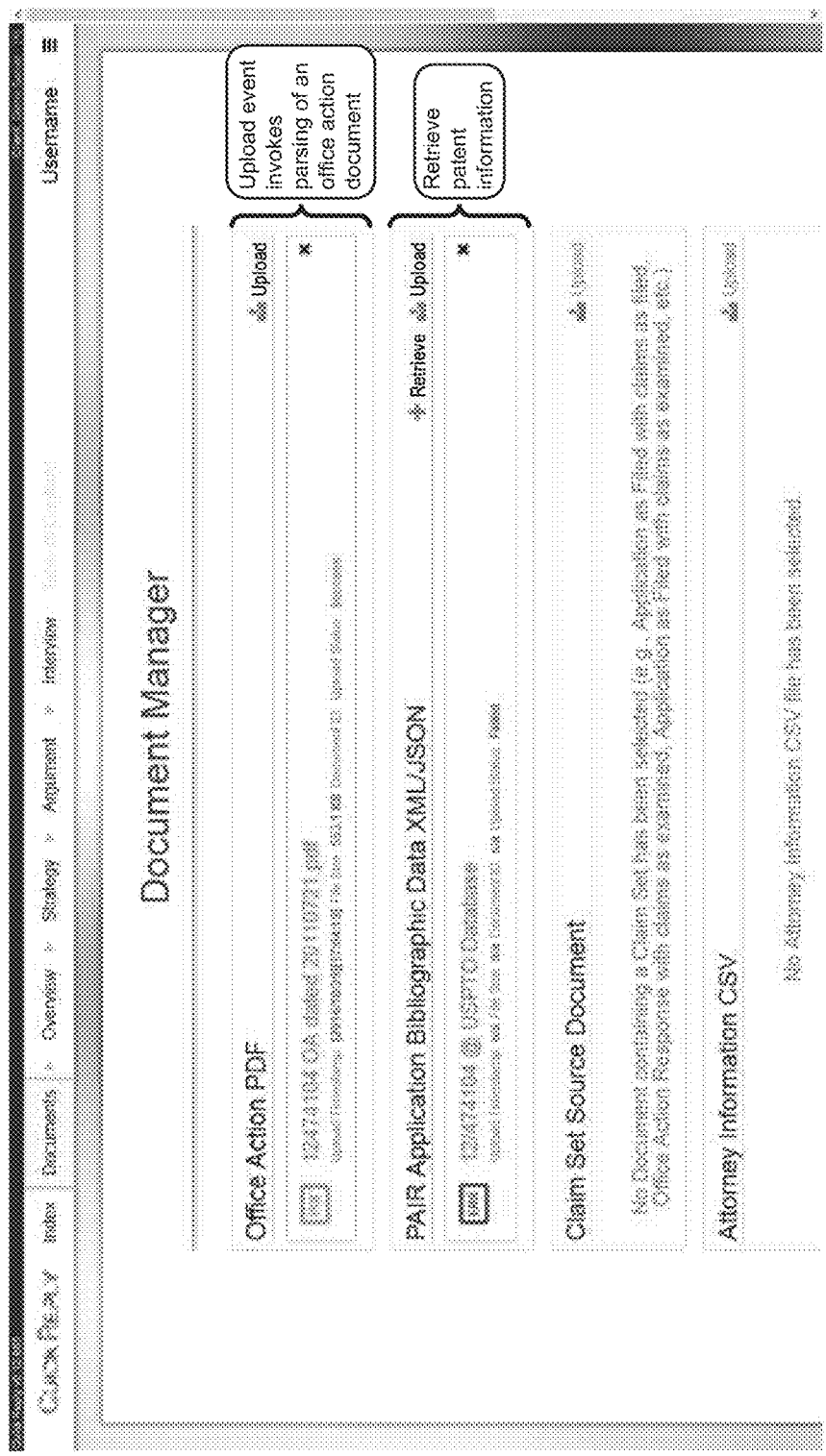
FIG. 10B depicts an input document management HCI as used to perform target document variable assignment operations prior to invoking computer-aided generation of a target output document from a systolic ruletree, according to an embodiment.

An input document management HCI is shown and discussed as pertaining to FIG. 10B.

FIG. 10B depicts an input document management HCI 10B00 as used to perform target document variable assignment operations prior to invoking computer-aided generation of a target output document from a systolic ruletree. As an option, one or more variations of input document management HCI 10B00 or any aspect thereof may be implemented in the context of the architecture and functionality of the embodiments described herein. The input document management HCI 10B00 or any aspect thereof may be implemented in any environment.

The embodiment shown in FIG. 10B is merely one example. As shown, the input document management HCI includes a widget to facilitate uploading of an office action document or other input document. The act of an upload can invoke processes to OCR and parse the uploaded document. Additionally, the input document management HCI includes a widget to facilitate retrieving additional information from an external repository. In the shown example, PAIR data can be gathered, either by direct retrieval from the external repository (e.g., via JSON delivered upon a query) or by an upload of PAIR bibliographic data found in a locally-stored XML, data file.

One result of the aforementioned parsing might include determination of values that correspond to a set of variables. In the case of parsing an office action in preparation for generating an office action reply, a set of variables might be pre-identified. Parsing and, specifically, determination of values that correspond to a set of such identified variable(s), can be used to formulate findings. The determined values can be used in passages of the target output document.

Figure 10C:
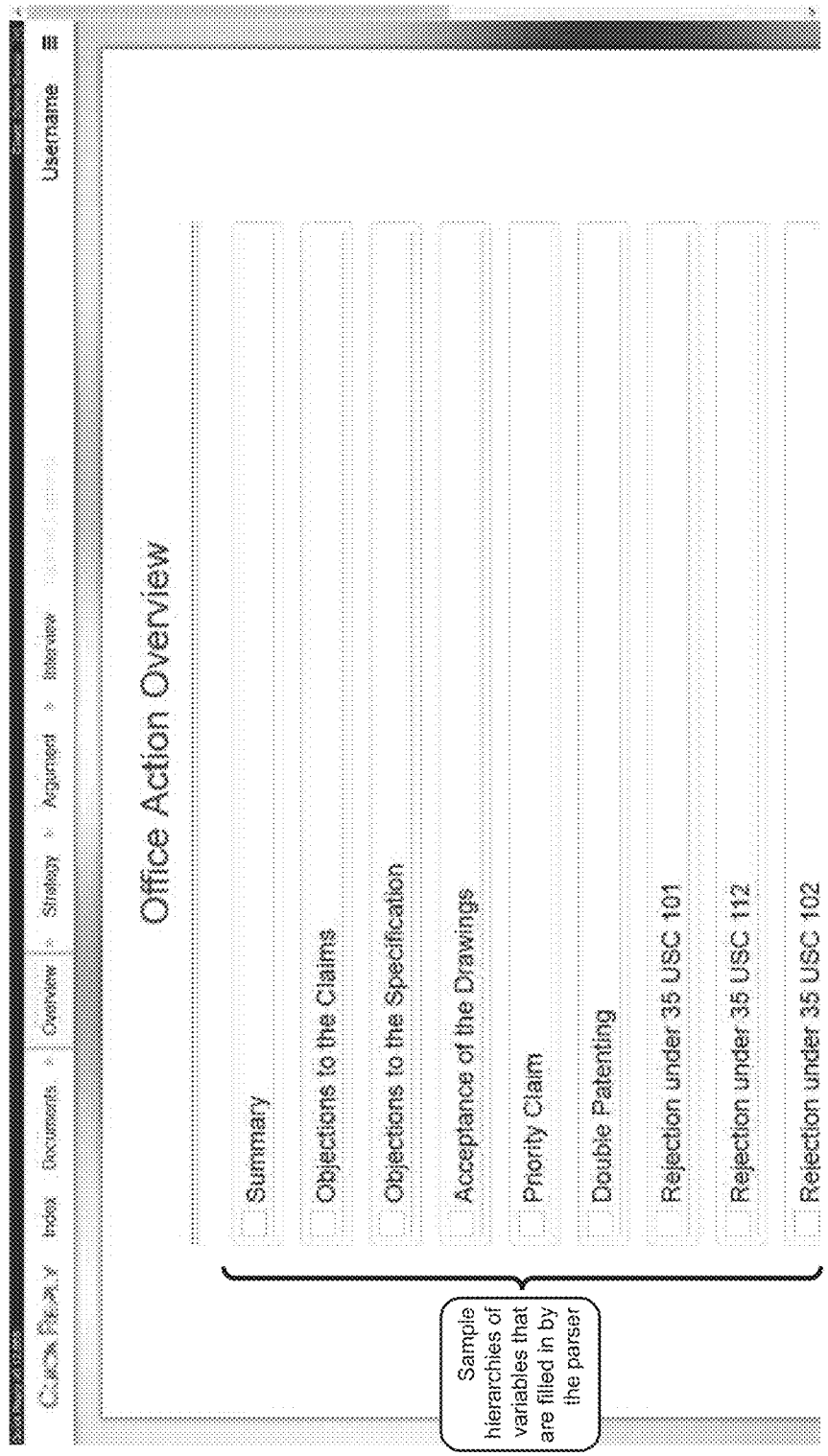
FIG. 10C depicts a set of sample fields in an office action overview presentation screen as used to perform target document construction operations prior to invoking computer-aided generation of a target output document from a systolic ruletree, according to an embodiment.

FIG. 10C depicts a set of sample fields in an office action overview presentation screen 10000 as used to perform target document construction operations prior to invoking computer-aided generation of a target output document from a systolic ruletree. As an option, one or more variations of office action overview presentation screen 10000 or any aspect thereof may be implemented in the context of the architecture and functionality of the embodiments described herein. The office action overview presentation screen 10000 or any aspect thereof may be implemented in any environment.

In this example, a set of variables are pre-identified and hierarchically organized. The office action overview presentation screen 10000 depicts sample hierarchies of variables that are filled in by a parser. Some of such values are shown and discussed as pertains to FIG. 10D.

Figure 10D:
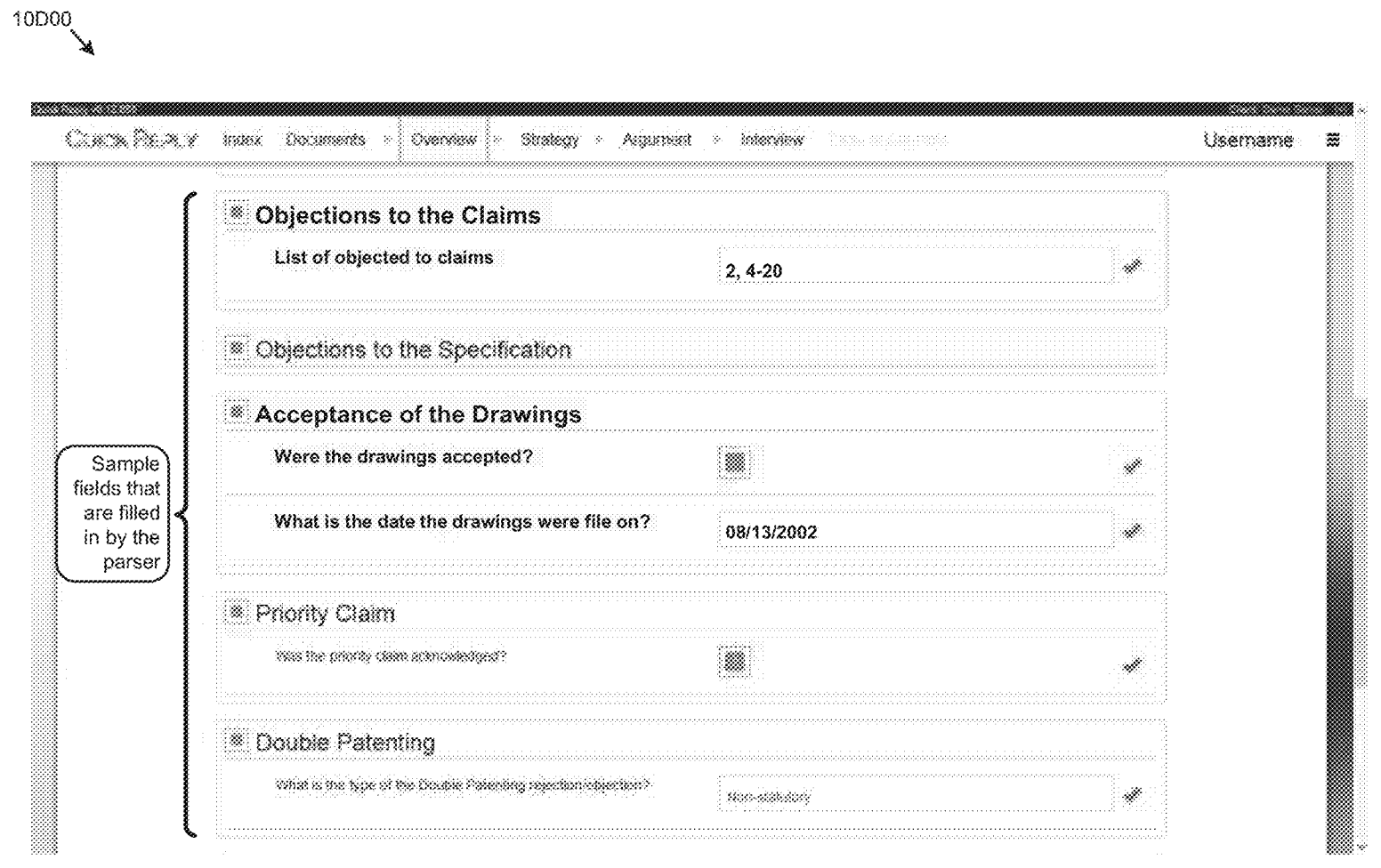

FIG. 10D depicts an HCI screen 10D00 to present a set of filled-in fields after parsing a USPTO office action. As an option, one or more variations of HCI screen 10D00 or any aspect thereof may be implemented in the context of the architecture and functionality of the embodiments described herein. The HCI screen 10D00 or any aspect thereof may be implemented in any environment.

The HCI screen 10D00 depicts several examples of filled-in fields. With respect to any "Objections to the Claims" the field "List of objected to claims" is filled in with the string value "2, 4-20". With respect to any "Acceptance of the Drawings" the checkbox field corresponding to the question, "Were the drawings accepted?" is filled in affirmatively (see the filled-in checkbox), and the field corresponding to the question, "What is the date the drawings were filed on?" is filled in with a date value.

In addition to parsing with a view toward filling in fields (e.g., as heretofore discussed), additional analysis can be performed over the office action data as a whole so as to make finding determinations.

Figure 10E:
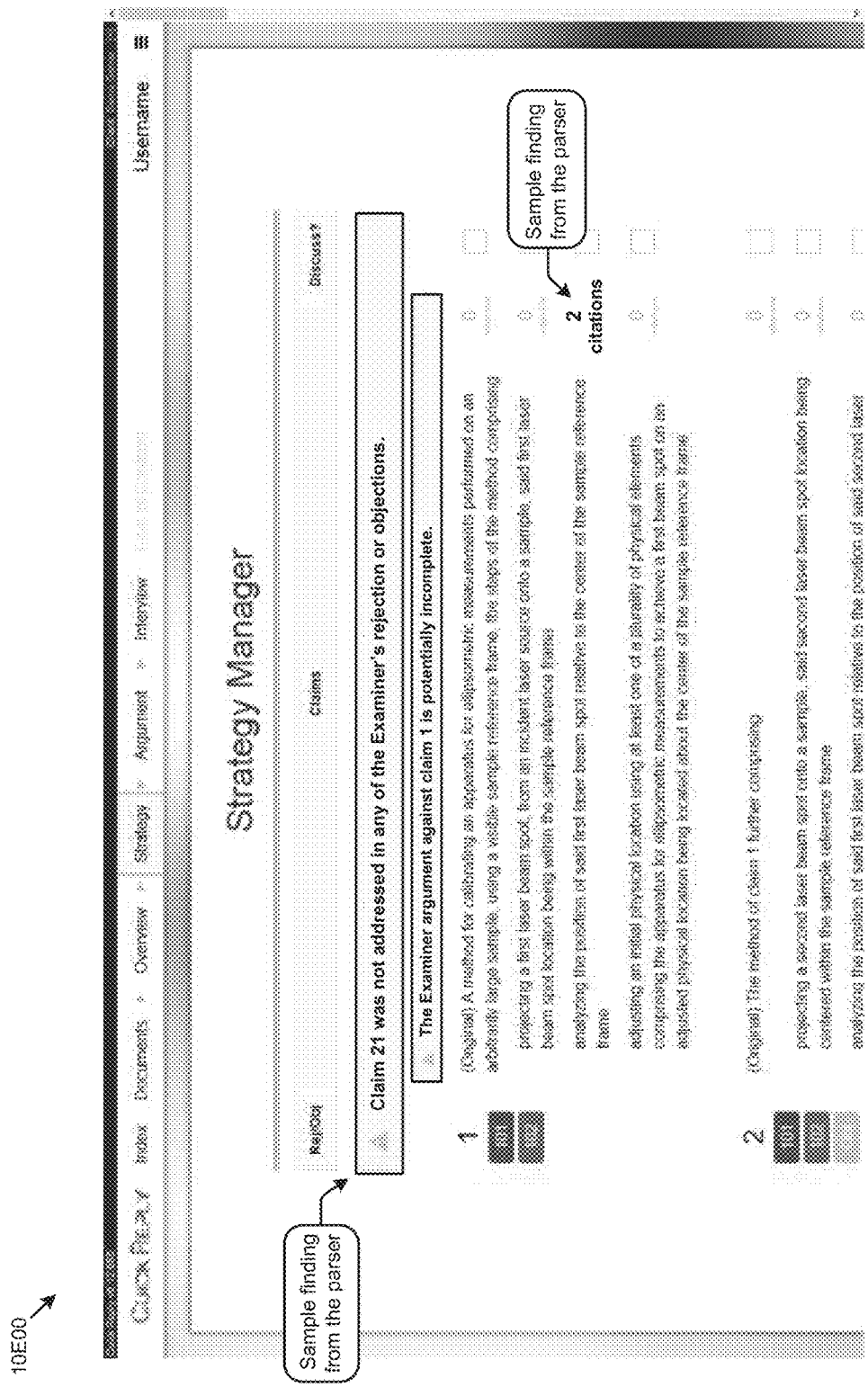
FIG. 10E depicts a first strategy manager HCI screen to present a set of findings after parsing a USPTO office action, according to an embodiment.

FIG. 10E depicts a first strategy manager HCI screen 10E00 to present a set of findings after parsing a USPTO office action. As an option, one or more variations of first strategy manager HCI screen 10E00 or any aspect thereof may be implemented in the context of the architecture and functionality of the embodiments described herein. The first strategy manager HCI screen 10E00 or any aspect thereof may be implemented in any environment.

The embodiment shown in FIG. 10E highlights a finding indicative of an omission. In the sample case shown, the parser determined that even through there were 21 claims examined, there was no rejection of claim 21. Such a scenario might be indicative of allowable material, or such a scenario might be indicative of an omission in the office action.

Additional findings with respect to the claims can be presented in a GUI such as the shown first strategy manager HCI screen 10E00. In the shown example, the parser finds that, even given that claim 1 has 3 claim elements, only the second claim element had an association with cited art (e.g., see the indication of "2 citations"). This is but one example of a finding that can be presented to a practitioner in GUI form. A practitioner might further interact with the GUI so as to indicate the practitioner's intent to discuss the element (e.g., amend the claim element and/or argue with respect to the citations). Such an indication (e.g., using a checkbox or other user interactions) can cause an addition of a rule or rules to the ruletree.

Figure 10F:
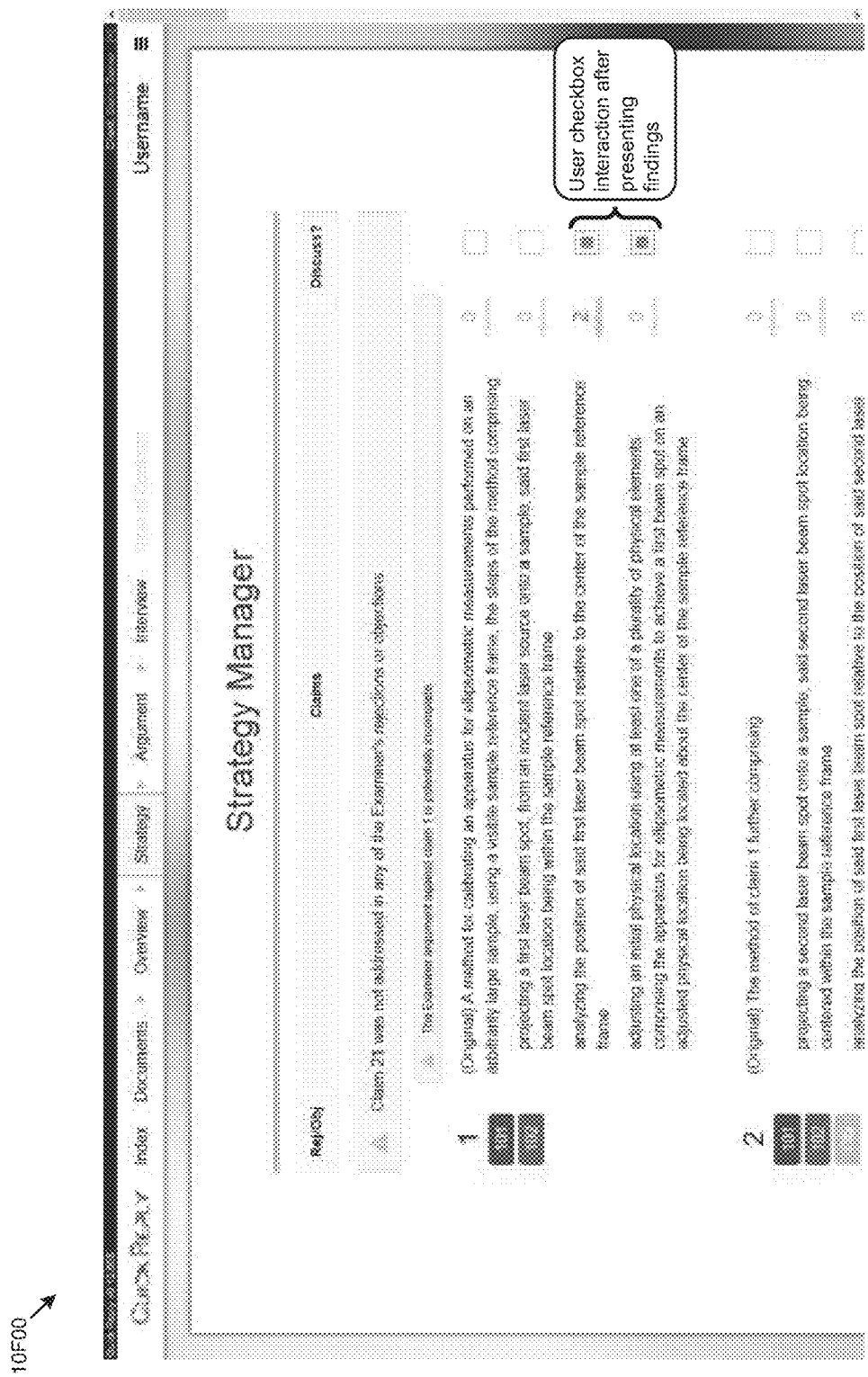
FIG. 10F depicts a second strategy manager HCI screen to capture user interactions resulting from presenting findings after parsing a USPTO office action, according to an embodiment.

FIG. 10F depicts a second strategy manager HCI screen 10F00 to capture user interactions resulting from presenting findings after parsing a USPTO office action. As an option, one or more variations of second strategy manager HCI screen 10F00 or any aspect thereof may be implemented in the context of the architecture and functionality of the embodiments described herein. The second strategy manager HCI screen 10F00 or any aspect thereof may be implemented in any environment.

As heretofore mentioned, a practitioner might interact with the GIU so as to indicate the practitioner's intent to discuss one or more claim elements. As shown, such an indication can be captured using checkboxes, which in turn can cause an addition of a rule to the ruletree on a one-to-one basis with respect to the checkboxes. The act of making such indications with checkboxes, and the addition of respective rules to the ruletree, has the effect of at least temporarily reserving a spot in the target output document. The checkbox or checkboxes can be unchecked, which has the effect of deleting the corresponding rule from the ruletree. In the context of patent prosecution practice, it is commonplace to initially plan to argue over a particular claim or claim element, and then later decide not to argue over that particular claim or claim element. The existence of, and management of, a systolic ruletree offers expedience in computer-aided preparation of an office action reply.

Turning on (or off) checkboxes is merely one form of adding (or deleting) rules from a ruletree. Other possibilities include use of widgets other screen devices to invoke rule deletion.

Figure 10G:
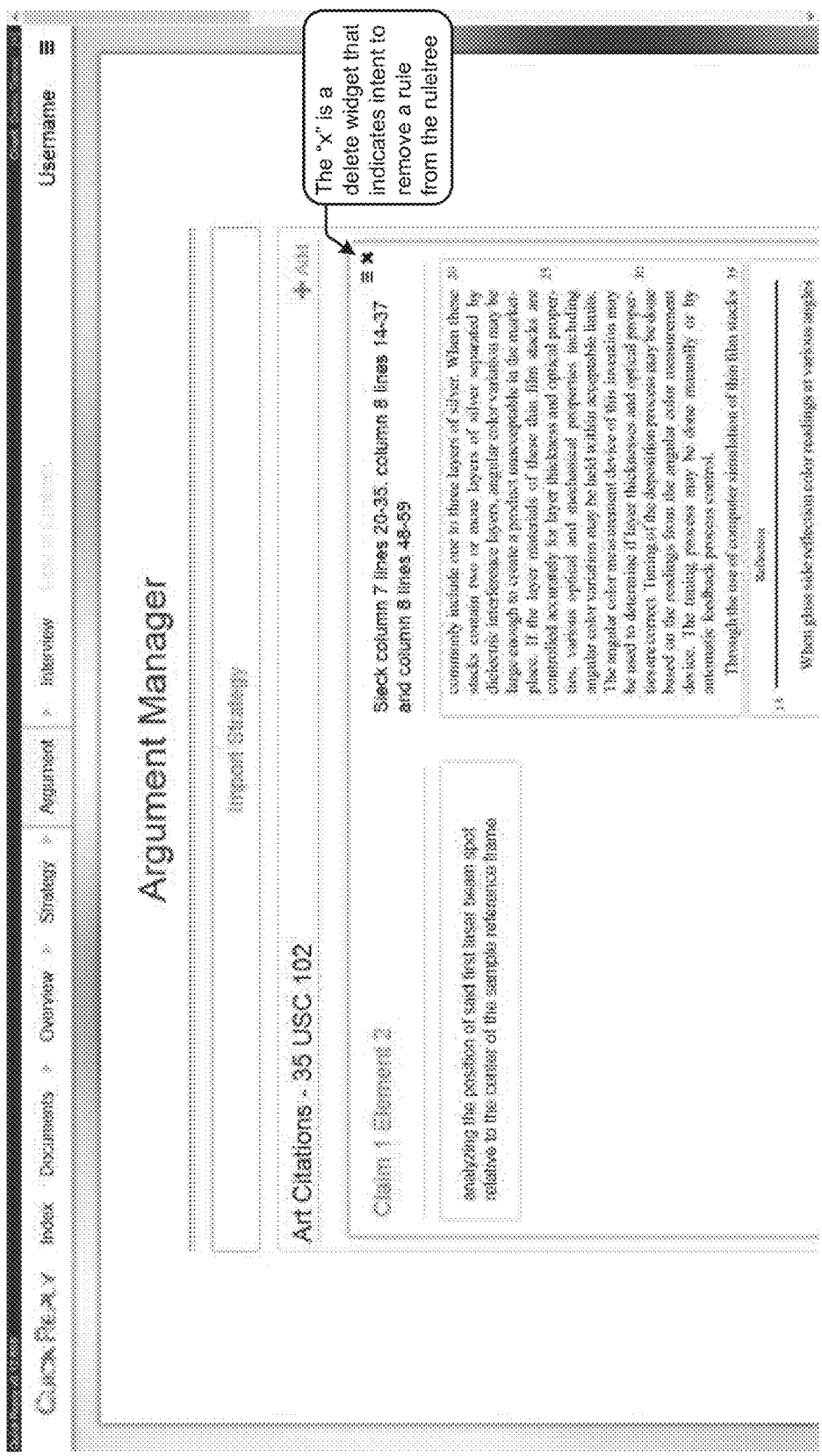
FIG. 10G depicts a rule deletion widget to capture user intent as an aspect of management of a systolic ruletree during computer-aided generation of a target output document, according to an embodiment.

FIG. 10G depicts a rule deletion widget to capture user intent as an aspect of management of a systolic ruletree during computer-aided generation of a target output document. As an option, one or more variations of rule deletion widget or any aspect thereof may be implemented in the context of the architecture and functionality of the embodiments described herein. The rule deletion widget or any aspect thereof may be implemented in any environment.

In this example, the user/practitioner can indicate intent to remove a rule from the rulebase by clicking on the "x".

Figure 11:
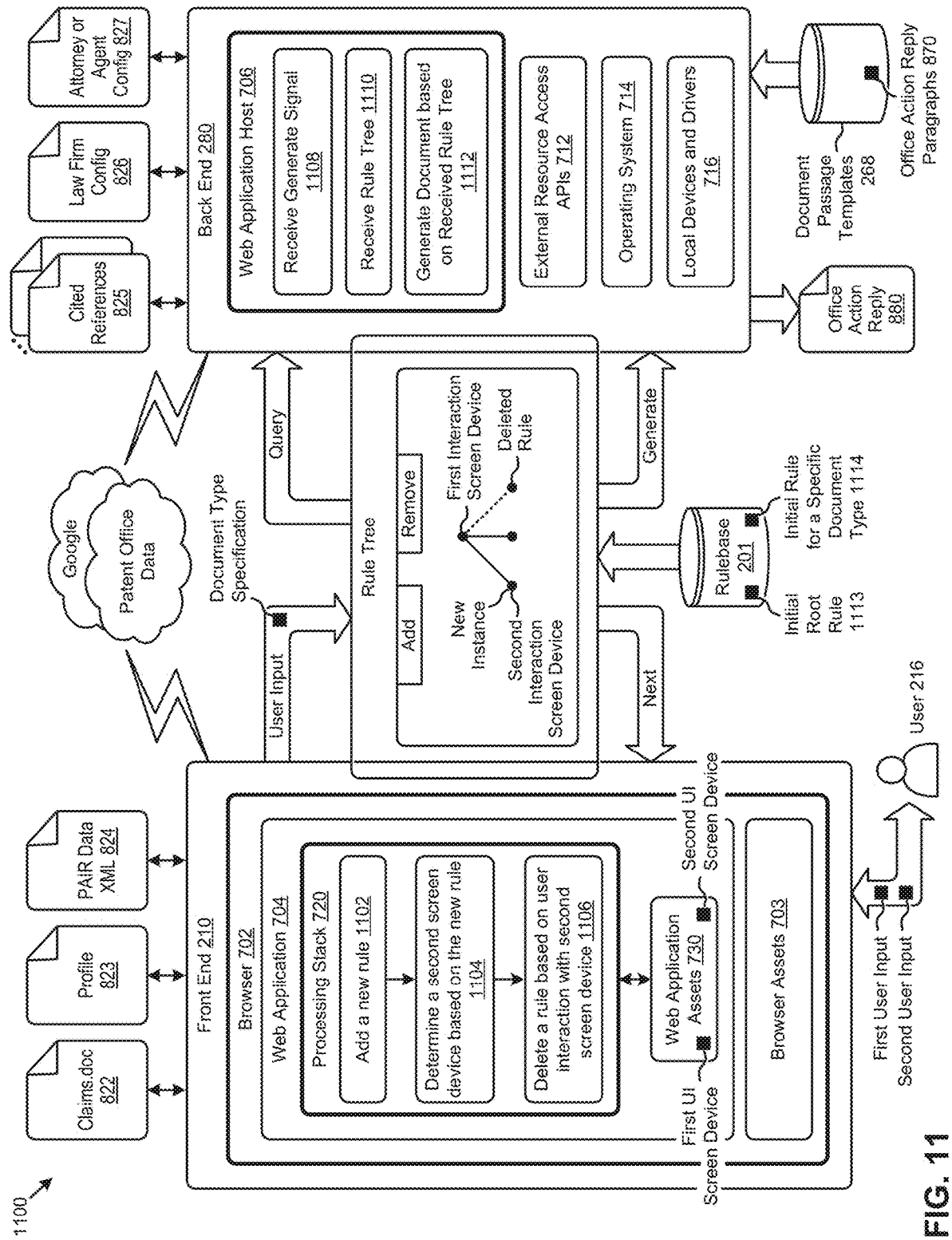
FIG. 11 depicts a web application system for managing a systolic ruletree during computer-aided generation of a target output document, according to an embodiment.

FIG. 11 depicts a web application system 1100 for managing a systolic ruletree during computer-aided generation of a target output document. As an option, one or more variations of web application system 1100 or any aspect thereof may be implemented in the context of the architecture and functionality of the embodiments described herein. The web application system 1100 or any aspect thereof may be implemented in any environment.

The embodiment shown in FIG. 11 is an example system where the user 216 interacts with a front end through a web application (e.g., in a browser) to compose a USPTO office action reply 880 by specifying (e.g., via successive modifications of the straddling systolic ruletree) an ordered set of office action reply paragraphs 870. Individual ones of the set of office action reply paragraphs 870 are formed by supplying variable values to the back end 280, which in turn replaces occurrences of variables found in the document passage templates 268 with respective variable values.

The shown embodiment has interconnected components that are configured to construct a target document (e.g., an office action reply 880) from a ruletree that is dynamically formed based on user answers to successive questions. In some cases the answers to the questions are used as variable values for respective variables. In some cases the answers to the questions are used to determine one or more follow-on questions, and so on.

Specification of an Initial Configuration

At some moment prior to or during user interaction with the web application, the back end is configured with a set of document passage templates. Such passages might be persistently stored in a file system or database accessible to the back end. Also, at some moment prior to or during user interaction with the browser, the web application is configured for access to a rulebase comprising a plurality of initial rules. At least one initial rule is selected from a rulebase (e.g., based on a mapping of an initial root rule 1113 to a respective document type 1114). In exemplary embodiments, the selected initial rule includes one or more user interface display screen devices that pose one or more questions in the user interface, and one or more user interface input screen devices that receive user input. At least one of such initial rules is used as a root node of a ruletree comprising one or more instances of initial rules from the rulebase.

Once a root node of the ruletree has been established, the front end of the web application proceeds to present a user interface display screen device (e.g., with a question) in juxtaposition with a user interaction input screen device (e.g., so that a user can input a response to the question). When the user has entered a value into the user interaction input screen device, then the corresponding rule in the ruletree is updated to reflect the user's response. Any actions that are given in the rule are fired, which in turn may create a set of conditions that cause another rule or rules to fire. In some cases the mere act of updating a rule in a ruletree is itself deemed to be an explicit change in conditions sufficient to fire the rule's own action or actions, and that action or actions might in turn fire a different rule.

Additional Cases for Adding a Rule

In most cases, upon receiving user input via a user interaction input screen device, a new instance of a rule is added to the ruletree (step 1102). A new instance of a rule may include a sort key and a default value. Often, default values (e.g., claim text) are retrieved by the rules engine via a back end response to a query. Default values are formatted into the user interaction input screen device (e.g., a rich text editor). The new rule can be added to the root to begin forming a first level (i.e., the root level being the zeroth level). The act of adding the new rule to the ruletree fires the rule. In most cases, firing a rule has an effect of presenting a next user interface screen device (e.g., comprising at least a next interaction identifier and a next interaction screen device) wherein the next user interface screen device is determined based at least in part on a data item of the newly added rule instance (step 1104). Further user interaction continues, adding new instances, firing actions, and adding still further rule instances.

In some cases, certain user input that is received (e.g., an indication of an explicitly unchecked checkbox) is indicative that the rule's de-action rather than the rule's action is to be processed. In many cases, processing a de-action has the effect of deleting one or more instances of a rule from the ruletree (step 1106). In exemplary cases, deleting a particular rule based on a de-action event has the effect of deleting all of its child rules as well.

Generating the Target Output Document

At some point during web application processing, the user may raise a generate signal (step 1108) to the rules engine, which in turn may initiate document generation processing in the back end. Such back end processing commences upon retrieving the ruletree (step 1110), which in turn initiates retrieval of the root node's initial passage (e.g., based at least in part on the sort key) from the set of document passage templates. The ruletree is traversed using document component ordering technique 600 to form a target output document (step 1112).

Additional Embodiments of the Disclosure

Additional Practical Application Examples

Figure 12A:
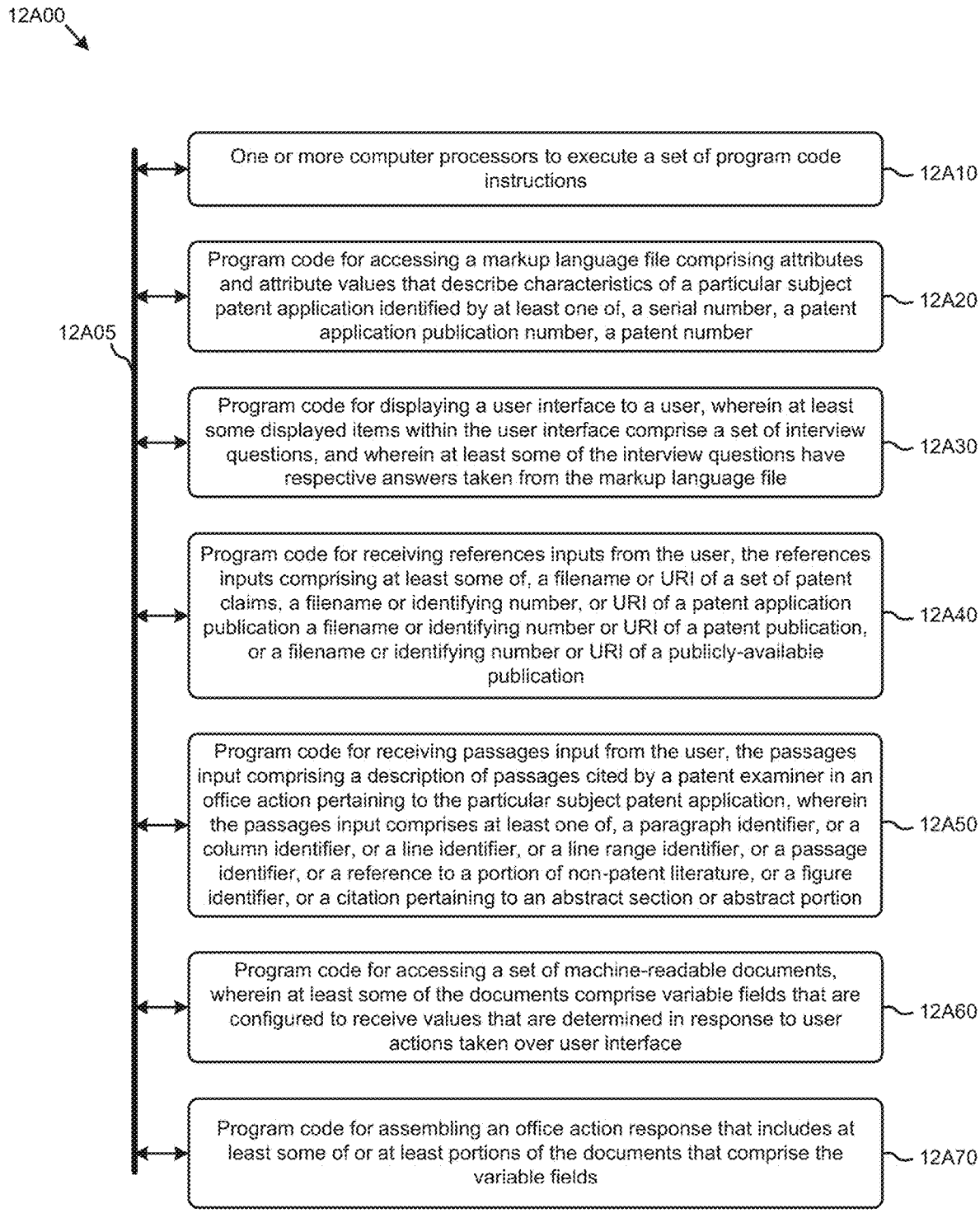
FIG. 12A, FIG. 12B, and FIG. 12C depict system components as arrangements of computing modules that are interconnected so as to implement certain of the herein-disclosed embodiments.

FIG. 12A depicts system components as an arrangement of computing modules that are interconnected to perform certain functions of a computer system. As an option, the system 12A00 may be implemented in the context of the architecture and functionality of the embodiments described herein. Of course, however, the system 12A00 or any operation therein may be carried out in any desired environment.

The system 12A00 comprises at least one processor and at least one memory, the memory serving to store program instructions corresponding to the operations of the system. As shown, an operation can be implemented in whole or in part using program instructions accessible by a module. The modules are connected to a communication path 12A05, and any operation can communicate with other operations over communication path 12A05. The modules of the system can, individually or in combination, perform method operations within system 12A00. Any operations performed within system 12A00 may be performed in any order unless as may be specified in the claims.

The shown embodiment implements a portion of a computer system, presented as system 12A00, comprising a computer processor to execute a set of program code instructions (module 12A10) and modules for accessing memory to hold program code instructions to perform: accessing a markup language file comprising attributes and attribute values that describe characteristics of a particular subject patent application identified by at least one of, a serial number, a patent application publication number, a patent number (module 12A20); displaying a user interface to a user, wherein at least some displayed items within the user interface comprise a set of interview questions, and wherein at least some of the interview questions have respective answers taken from the markup language file (module 12A30); receiving references inputs from the user, the references inputs comprising at least some of, a filename or URI of a set of patent claims, a filename or identifying number, or URI of a patent application publication a filename or identifying number or URI of a patent publication, or a filename or identifying number or URI of a publicly-available publication (module 12A40); receiving passages input from the user, the passages input comprising a description of passages cited by a patent examiner in an office action pertaining to the particular subject patent application, wherein the passages input comprises at least one of, a paragraph identifier, or a column identifier, or a line identifier, or a line range identifier, or a passage identifier, or a reference to a portion of non-patent literature, or a figure identifier, or a citation pertaining to an abstract section or abstract portion (module 12A50); accessing a set of machine-readable documents, wherein at least some of the documents comprise variable fields that are configured to receive values that are determined in response to user actions taken over user interface (module 12A60); and assembling an office action response that includes at least some of or at least portions of the documents that comprise the variable fields (module 12A70).

Figure 12B:
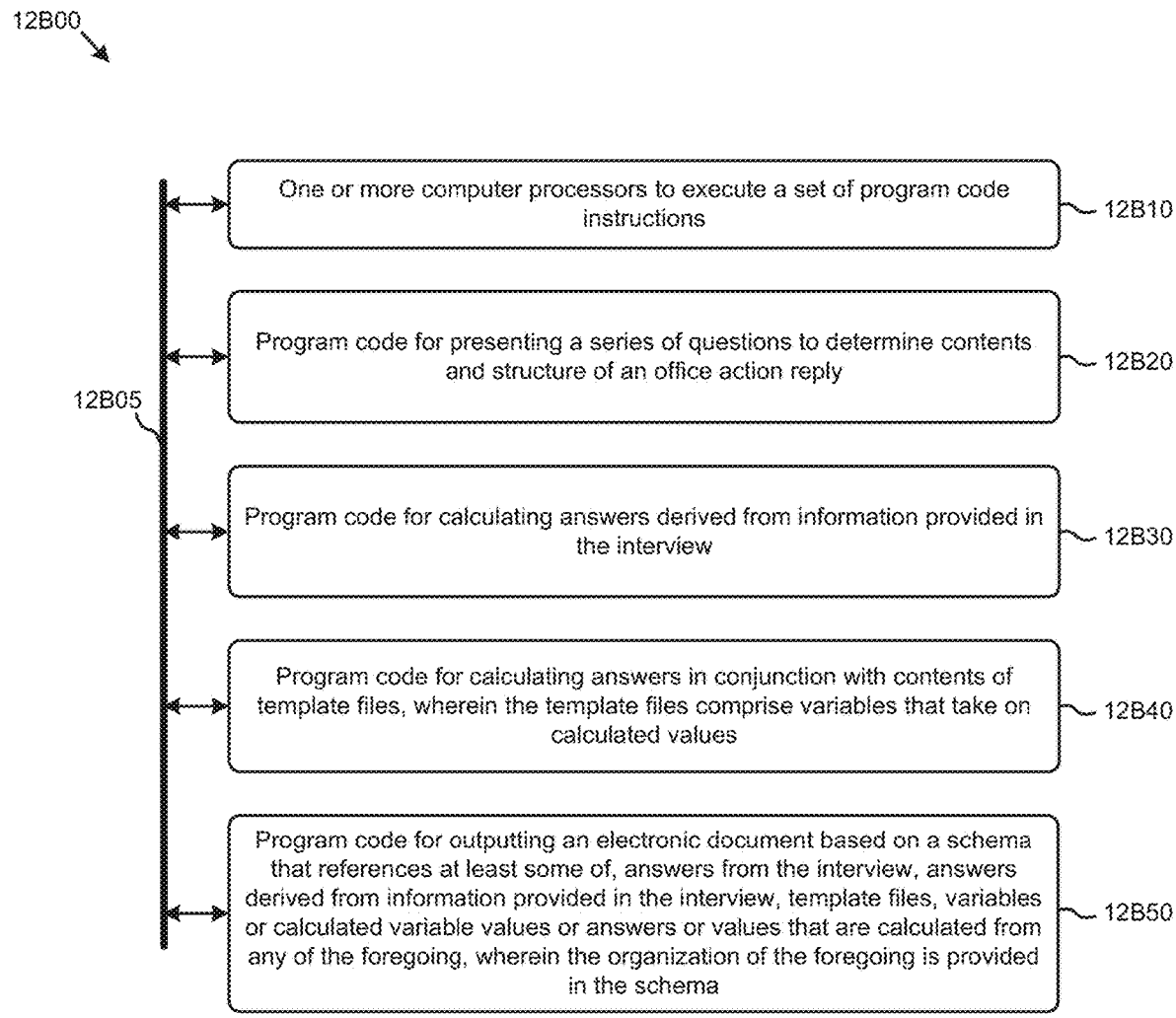

FIG. 12B depicts a system 12B00 as an arrangement of computing modules that are interconnected so as to operate cooperatively to implement certain of the herein-disclosed embodiments. This and other embodiments present particular arrangements of elements that, individually and/or as combined, serve to form improved technological processes that address breaking the deadlock scenario where an HCI interview flow cannot be known from the format of a target output document and, at the same time, the format of the target output document cannot be known until the interview is complete. The partitioning of system 12B00 is merely illustrative and other partitions are possible. As an option, the system 12B00 may be implemented in the context of the architecture and functionality of the embodiments described herein. Of course, however, the system 12B00 or any operation therein may be carried out in any desired environment.

The system 12B00 comprises at least one processor and at least one memory, the memory serving to store program instructions corresponding to the operations of the system. As shown, an operation can be implemented in whole or in part using program instructions accessible by a module. The modules are connected to a communication path 12B05, and any operation can communicate with other operations over communication path 12B05. The modules of the system can, individually or in combination, perform method operations within system 12B00. Any operations performed within system 12B00 may be performed in any order unless as may be specified in the claims.

The shown embodiment implements a portion of a computer system, presented as system 12B00, comprising a computer processor to execute a set of program code instructions (module 12B10) and modules for accessing memory to hold program code instructions to perform: presenting a series of questions to determine contents and structure of an office action reply (module 12B20); calculating answers derived from information provided in the interview (module 12B30); calculating answers in conjunction with contents of template files, wherein the template files comprise variables that take on calculated values (module 12B40); and outputting an electronic document based on a schema that references at least some of, answers from the interview, answers derived from information provided in the interview, template files, variables or calculated variable values or answers or values that are calculated from any of the foregoing, wherein the organization of the foregoing is provided in the schema (module 12B50).

Variations of the foregoing may include more or fewer of the shown modules. Certain variations may perform more or fewer (or different) steps, and/or certain variations may use data elements in more, or in fewer (or different) operations.

Figure 12C:
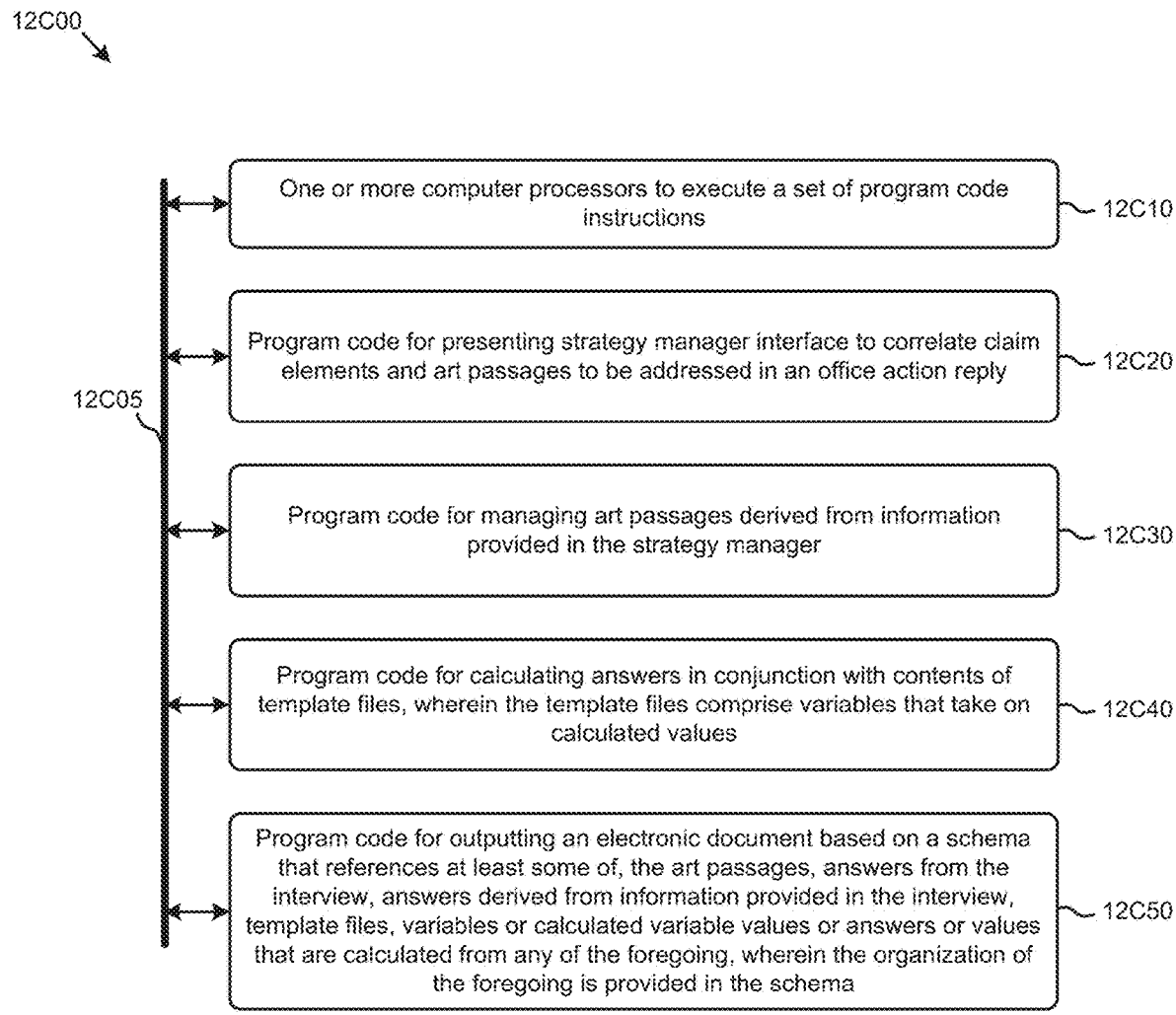

FIG. 12C depicts a system 12C00 as an arrangement of computing modules that are interconnected so as to operate cooperatively to implement certain of the herein-disclosed embodiments. The partitioning of system 12C00 is merely illustrative and other partitions are possible. As an option, the system 12C00 may be implemented in the context of the architecture and functionality of the embodiments described herein. Of course, however, the system 12C00 or any operation therein may be carried out in any desired environment.

The system 12C00 comprises at least one processor and at least one memory, the memory serving to store program instructions corresponding to the operations of the system. As shown, an operation can be implemented in whole or in part using program instructions accessible by a module. The modules are connected to a communication path 12C05, and any operation can communicate with other operations over communication path 12C05. The modules of the system can, individually or in combination, perform method operations within system 12C00. Any operations performed within system 12C00 may be performed in any order unless as may be specified in the claims.

The shown embodiment implements a portion of a computer system, presented as system 12C00, comprising a computer processor to execute a set of program code instructions (module 12C10) and modules for accessing memory to hold program code instructions to perform: presenting a strategy manager interface to correlate claim elements and art passages to be presented in an office action reply (module 12C20); presenting a user interface to manage art passages derived from information provided in the strategy manager (module 12C30); calculating answers in conjunction with contents of template files, wherein the template files comprise variables that take on calculated values (module 12C40); and outputting an electronic document based on a schema that references at least some of, the art passages, answers from the interview, answers derived from information provided in the interview, template files, variables or calculated variable values or answers or values that are calculated from any of the foregoing, wherein the organization of the foregoing is provided in the schema (module 12C50).

Still further, some embodiments include variations in the operations performed, and some embodiments include variations of aspects of the data elements used in the operations.

Some embodiments include optical character recognition of an office action.

Some embodiments include extracting of examiner information from an office action.

Some embodiments include a multiple user environment.

Some embodiments include a secure repository for storage.

Some embodiments include payment processing.

Some embodiments include automated server maintenance.

Some embodiments include accessing and acquiring of figure images from the USPTO.

Some embodiments include using EPF files to access PAIR and download patent application bibliographic information.

Some embodiments include a web interface for amending the claims.

Some embodiments include integration with a docketing system.

System Architecture Overview

Additional System Architecture Examples

Figure 13A:
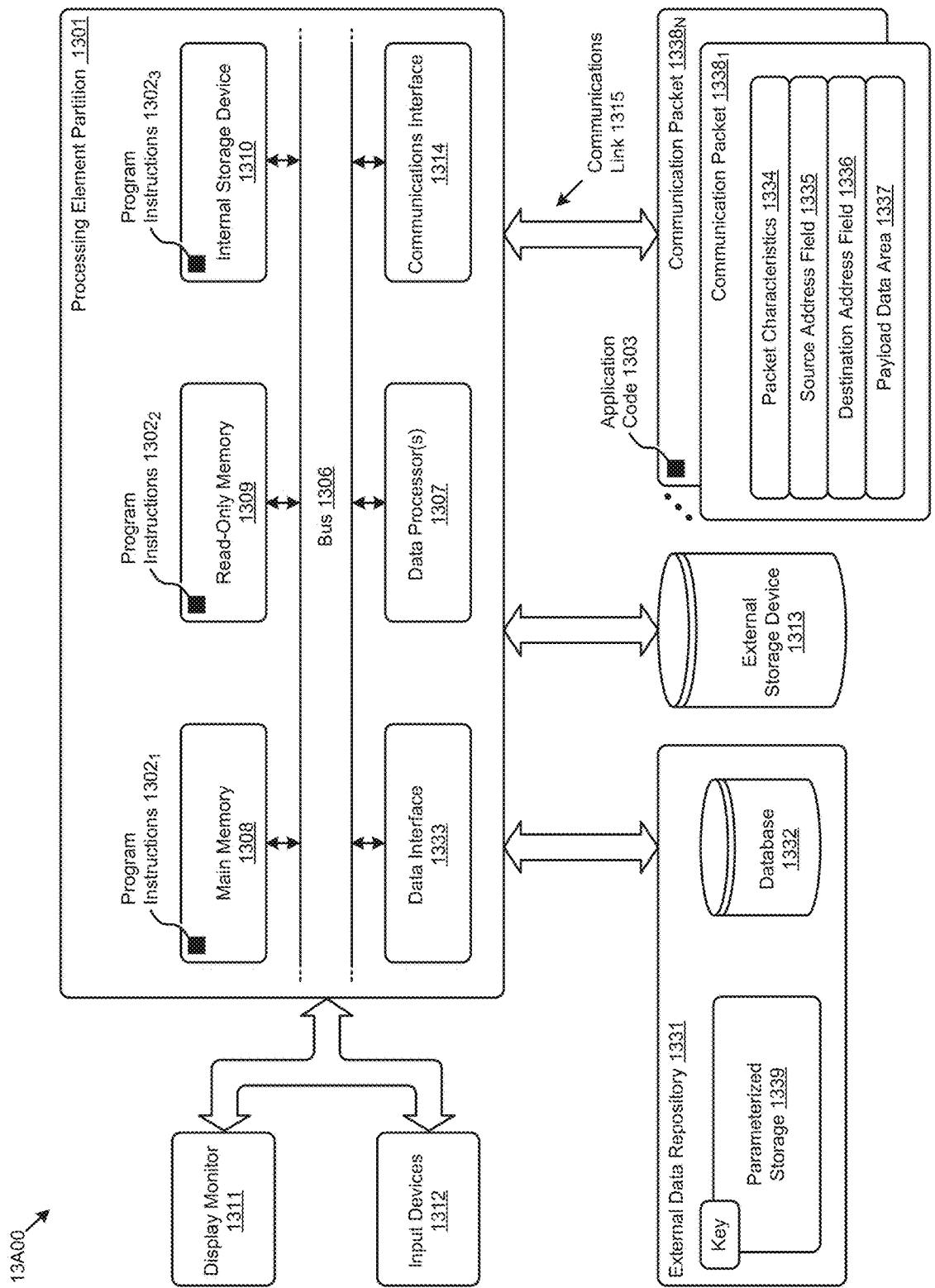
FIG. 13A, FIG. 13B, and FIG. 13C depict example architectures of components suitable for implementing embodiments of the present disclosure and/or for use in the herein-described environments.

FIG. 13A depicts a block diagram of an instance of a computer system 13A00 suitable for implementing embodiments of the present disclosure. Computer system 13A00 includes a bus 1306 or other communication mechanism for communicating information. The bus interconnects subsystems and devices such as a CPU, or a multi-core CPU (e.g., data processor 1307), a system memory (e.g., main memory 1308, or an area of random access memory (RAM)), a non-volatile storage device or non-volatile storage area (e.g., read-only memory 1309), an internal storage device 1310 or external storage device 1313 (e.g., magnetic or optical), a data interface 1333, a communications interface 1314 (e.g., PHY, MAC, Ethernet interface, modem, etc.). The aforementioned components are shown within processing element partition 1301, however other partitions are possible. The shown computer system 13A00 further comprises a display 1311 (e.g., CRT or LCD), various input devices 1312 (e.g., keyboard, cursor control), and an external data repository 1331.

According to an embodiment of the disclosure, computer system 13A00 performs specific operations by data processor 1307 executing one or more sequences of one or more program code instructions contained in a memory. Such instructions (e.g., program instructions 13021, program instructions 13022, program instructions 13023, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 13A00 performs specific networking operations using one or more instances of communications interface 1314. Instances of the communications interface 1314 may comprise one or more networking ports that are configurable (e.g., pertaining to speed, protocol, physical layer characteristics, media access characteristics, etc.) and any particular instance of the communications interface 1314 or port thereto can be configured differently from any other particular instance. Portions of a communication protocol can be carried out in whole or in part by any instance of the communications interface 1314, and data (e.g., packets, data structures, bit fields, etc.) can be positioned in storage locations within communications interface 1314, or within system memory, and such data can be accessed (e.g., using random access addressing, or using direct memory access DMA, etc.) by devices such as data processor 1307.

The communications link 1315 can be configured to transmit (e.g., send, receive, signal, etc.) any types of communications packets (e.g., communications packet 13381, communications packet 1338N) comprising any organization of data items. The data items can comprise a payload data area 1337, a destination address 1336 (e.g., a destination IP address), a source address 1335 (e.g., a source IP address), and can include various encodings or formatting of bit fields to populate the shown packet characteristics 1334. In some cases the packet characteristics include a version identifier, a packet or payload length, a traffic class, a flow label, etc. In some cases the payload data area 1337 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1307 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1331, which in turn can be formatted into any one or more storage areas, and which can comprise parameterized storage 1339 accessible by a key (e.g., filename, table name, block address, offset address, etc.).

Execution of the sequences of instructions to practice certain embodiments of the disclosure are performed by a single instance of the computer system 13A00. According to certain embodiments of the disclosure, two or more instances of computer system 13A00 coupled by a communications link 1315 (e.g., LAN, PTSN, or wireless network) may perform the sequence of instructions required to practice embodiments of the disclosure using two or more instances of components of computer system 13A00.

The computer system 13A00 may transmit and receive messages such as data and/or instructions organized into a data structure (e.g., communications packets). The data structure can include program instructions (e.g., application code 1303), communicated through communications link 1315 and communications interface 1314. Received program code may be executed by data processor 1307 as it is received and/or stored in the shown storage device or in or upon any other non-volatile storage for later execution. Computer system 13A00 may communicate through a data interface 1333 to a database 1332 on an external data repository 1331. Data items in a database can be accessed using a primary key (e.g., a relational database primary key).

The processing element partition 1301 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1307. Some embodiments include one or more special-purpose hardware components (e.g., power control, logic, sensors, transducers, etc.). Some embodiments of a module include instructions that are stored in a memory for execution so as to implement algorithms that facilitate operational and/or performance characteristics pertaining to managing a systolic ruletree during computer-aided generation of a target output document. A module may include one or more state machines and/or combinational logic used to implement or facilitate the operational and/or performance characteristics of managing a systolic ruletree during computer-aided generation of a target output document.

Various implementations of the database 1332 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing a systolic ruletree during computer-aided generation of a target output document). Such files or records can be brought into and/or stored in volatile or non-volatile memory.

Figure 13B:
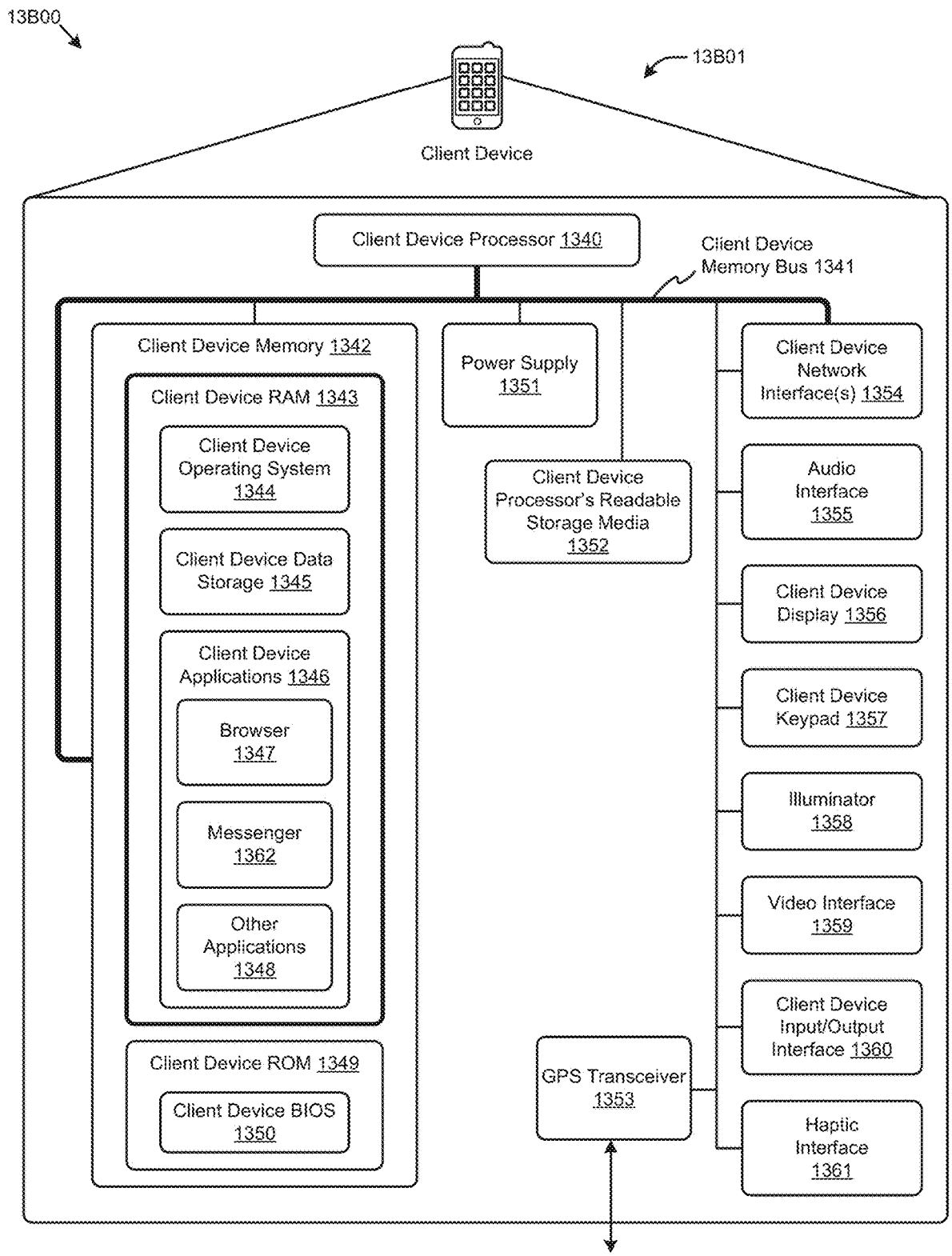

FIG. 13B depicts a block diagram 13B00 of an instance of a client device 13B01 that may be included in a system implementing instances of the herein-disclosed embodiments. Client device 13B01 may include many more or fewer components than those shown in FIG. 13B. Client device 13B01 may represent, for example, an embodiment of at least one of client devices as heretofore disclosed.

As shown in the figure, client device 13B01 includes a client device processor 1340 in communication with a client device memory 1342 via a client device memory bus 1341. Client device 13B01 also includes a power supply 1351, one or more client device network interfaces 1354, an audio interface 1355, a client device display 1356, a client device keypad 1357, an illuminator 1358, a video interface 1359, a client device I/O (input/output or IO) interface 1360, a haptic interface 1361, and a GPS transceiver 1353 for global positioning services.

The power supply 1351 provides power to client device 13B01. A rechargeable or non-rechargeable battery may be used to provide power. The power may also be provided by an external power source such as an AC adapter or a powered docking cradle that supplements and/or recharges a battery.

A client device 13B01 may optionally communicate with a base station, or directly with another computing device. A client device network interface 1354 includes circuitry for coupling a client device 13B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. A client device network interface is sometimes known as a transceiver, a transceiving device, or a network interface card (NIC).

An audio interface 1355 is arranged to produce and receive audio signals such as the sound of a human voice. For example, audio interface 1355 may be coupled to a speaker and microphone to facilitate telecommunication with others and/or generate an audio acknowledgement for some action.

A client device display 1356 may be a liquid crystal display (LCD), gas plasma, light emitting diode (LED), or any other type of display used with a computing device. A client device display 1356 may also include a touch sensitive screen arranged to receive input from an object such as a stylus or a digit from a human hand.

A client device keypad 1357 may comprise any input device arranged to receive input from a user. For example, client device keypad 1357 may include a push button numeric dial, or a keyboard. A client device keypad 1357 may also include command buttons that are associated with selecting and sending images.

An illuminator 1358 may provide a status indication and/or provide light. Illuminator 1358 may remain active for specific periods of time or in response to events. For example, when the illuminator 1358 is active, it may backlight the buttons on client device keypad 1357 and stay on while the client device is powered. Also, the illuminator 1358 may backlight these buttons in various patterns when particular actions are performed such as dialing another client device. An illuminator 1358 may also cause light sources positioned within a transparent or translucent case of the client device to illuminate in response to actions.

A video interface 1359 is arranged to capture video images such as a still photo, a video segment, an infrared video or the like. For example, the video interface 1359 may be coupled to a digital video camera, a web-camera or the like. A video interface 1359 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 13B01 comprise a client device IO interface 1360 for communicating with external devices such as a headset, or other input or output devices not shown in FIG. 13B. The client device IO interface 1360 can use one or more communication technologies such as a USB, infrared, Bluetooth™ port or the like. A haptic interface 1361 is arranged to as a human interface device (HID) to facilitate interaction with a user of a client device. Such interaction can include tactile feedback to a user of the client device. For example, the haptic interface 1361 may be employed to cause vibration of the client device 13B01 in a particular way (e.g., with a pattern or periodicity) and/or when interacting with one or another user.

A GPS transceiver 1353 can determine the physical coordinates of client device 13B01 on the surface of the Earth. The GPS transceiver 1353, in some embodiments, may be optional. The shown GPS transceiver 1353 outputs a location such as a latitude value and a longitude value. However, the GPS transceiver 1353 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 13B01 on the surface of the Earth. It is understood that under different conditions, a GPS transceiver 1353 can determine a physical location within millimeters for client device 13B01; and in other cases, the determined physical location may be less precise such as within a meter or significantly greater distances. In certain embodiments, the client device 13B01 may provide other information that may be employed to determine a physical location of the device including, for example, a media access control (MAC) address, IP address, IP port identifier, or the like.

The client device memory 1342 includes random access memory 1343, read-only memory 1349, and other computer-readable storage. The client device memory 1342 illustrates an example of computer readable storage media (devices) for storage of information such as computer readable instructions, data structures, program modules or other data. The client device memory 1342 stores a basic IO system (BIOS) in the embodiment of client device BIOS 1350 for controlling low-level operation of client device 13B01. The memory also stores an operating system 1344 for controlling the operation of client device 13B01. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian® operating system. The operating system may include or interface with a Java virtual machine module that enables control of hardware components and/or operating system operations via Java application programs.

The client device memory 1342 further includes one or more instances of client device data storage 1345, which can be used by client device 13B01 to store, among other things, client device applications 1346 and/or other data. For example, client device data storage 1345 may also be employed to store information that describes various capabilities of client device 13B01. The information may then be provided to another device based on any of a variety of events including being sent as part of a header during a communication, sent upon request or the like. Client device data storage 1345 may also be employed to store social networking information including address books, buddy lists, aliases, user profile information or the like. Further, client device data storage 1345 may also store messages, web page content, or any of a variety of content (e.g., received content, user generated content, etc.).

At least a portion of the information may also be stored on any component or network device including, but not limited, to a client device processor's readable storage media, a disk drive or other computer readable storage devices within client device 13B01, etc.

An instance of a client device processor's readable storage media 1352 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store information and which can be accessed by a computing device. The aforementioned readable storage media may also be referred to herein as computer readable storage media.

The client device applications 1346 may include computer executable instructions which, when executed by client device 13B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 1346 may include, for example, a messenger 1362, a browser 1347, and other applications 1348. Certain instances of other applications 1348 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, the applications may collect and store user data that may be received from other computing devices in the environment.

A messenger 1362 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 1362 may be configured as an IM application such as AOL (America Online) instant messenger, Yahoo! messenger, .NET messenger server, ICQ or the like. In certain embodiments, the messenger 1362 may be configured to include a mail user agent (MUA) such as Elm, Pine, message handling (MH), Outlook, Eudora, Mac Mail, Mozilla Thunderbird or the like. In another embodiment, the messenger 1362 may be a client device application that is configured to integrate and employ a variety of messaging protocols including, but not limited, to various push and/or pull mechanisms for client device 13B01. In certain embodiments, the messenger 1362 may interact with the browser 1347 for managing messages. As used herein, the term "message" refers to any of a variety of messaging formats, or communications form including, but not limited to, email, SMS, IM, MMS, IRC or the like.

A browser 1347 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 1347 may enable a user of client device 13B01 to communicate with another network device as may be present in the environment.

Figure 13C:
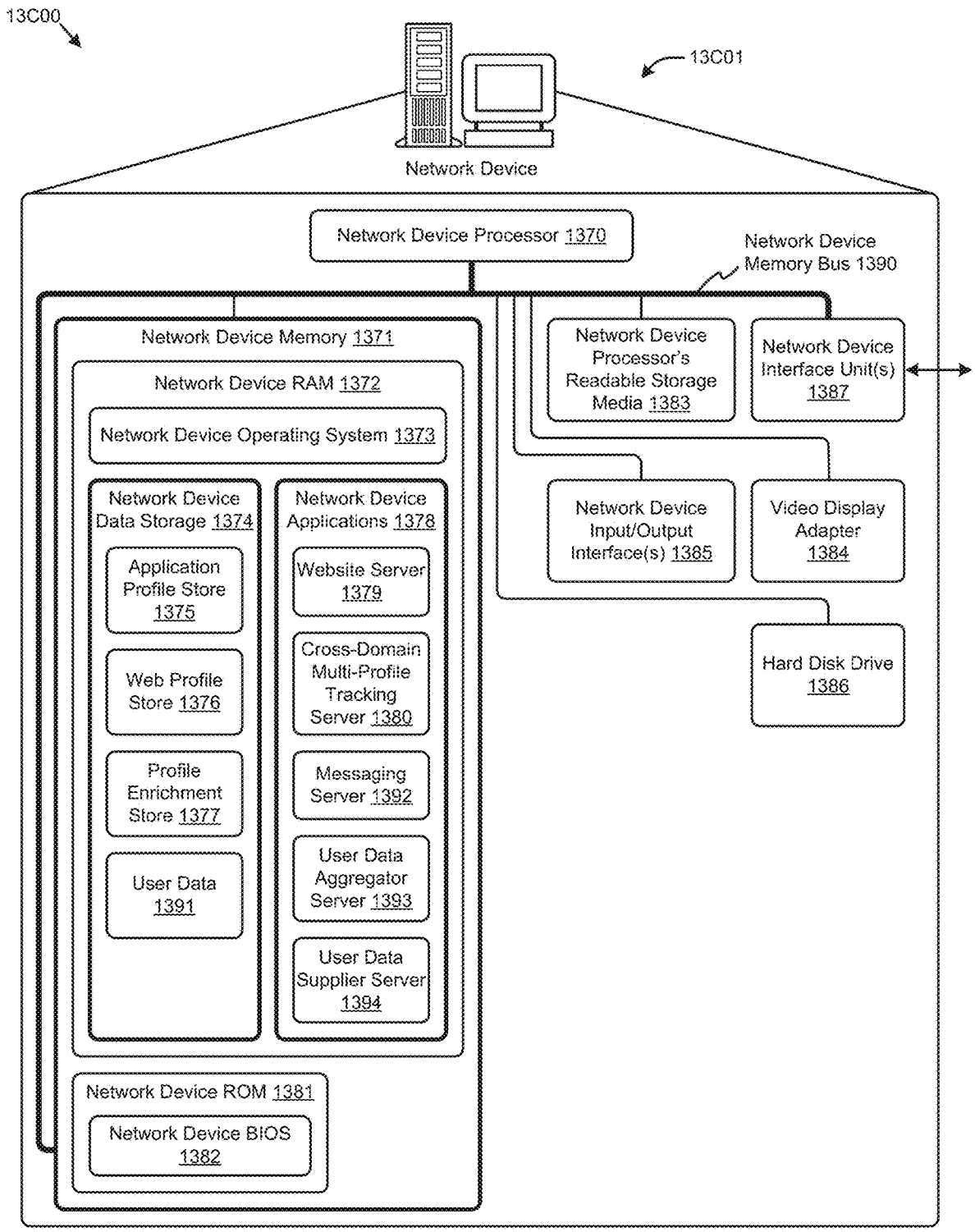

FIG. 13C depicts a block diagram 13C00 of an instance of a network device 13C01 that may be included in a system implementing instances of the herein-disclosed embodiments. Network device 13C01 may include many more or fewer components than those shown. Network device 13C01 may be configured to operate as a server, client, peer, a host, or any other device.

The network device 13C01 includes at least one instance of a network device processor 1370, instances of readable storage media, one or more instances of a network interface unit 1387, a network device IO interface 1385, a hard disk drive 1386, a video display adapter 1384, and a network device memory 1371, all in communication with each other via a network device memory bus 1390. The network device memory generally includes network device RAM 1372, network device ROM 1381. Some embodiments include one or more non-volatile mass storage devices such as a hard disk drive 1386, a tape drive, an optical drive, and/or a floppy disk drive. The network device memory stores a network device operating system 1373 for controlling the operation of network device 13C01. Any general-purpose operating system may be employed. A basic input/output system (BIOS) is also provided in the form of network device BIOS 1382 for controlling the low-level operation of network device 13C01. As illustrated in FIG. 13C, a network device 13C01 also can communicate with the Internet, or some other communications network, via a network interface unit 1387, which is constructed for use with various communication protocols including the TCP/IP protocol. A network interface unit 1387 is sometimes known as a transceiver, a transceiving device, or a network interface card (NIC). Network device 13C01 also comprises a network device IO interface 1385 for communicating with external devices such as a keyboard or other input or output devices. A network device IO interface 1385 can use one or more communication technologies such as USB, infrared, Bluetooth™ or the like.

The storage devices as described above may use various types of computer readable media, namely tangible forms of non-volatile computer readable storage media and/or a client device processor's readable storage media 1352 and/or a network device processor's readable storage media 1383.

Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store information and which can be accessed by a computing device.

As shown, network device data storage 1374 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 1374 may further include program code, data, algorithms and the like, for use by a processor such as a network device processor 1370 to execute and perform actions. In certain embodiments, at least some of the logical contents of network device data storage 1374 might be stored on another component of network device 13C01 such as on a second instance of hard disk drive 1386 or on an external/removable storage device.

The network device data storage 1374 may further store any portions of application data and/or user data such as an application profile store 1375, a web profile store 1376, a profile enrichment store 1377 and/or any user data collected. In some embodiments, user data 1391 may store unique user data, non-unique user data, aggregated user data, and/or any combination thereof. User data 1391 may include a variety of attributes such as a five digit zip code, an expanded nine digit zip code and the like.

The Network device data storage 1374 may also store program code and data. One or more network device applications 1378 may be loaded into network device data storage or any other mass memory, to be accessible to run with or as a part of network device operating system 1373. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 1392, website server 1379, user data aggregator server 1393, a cross-domain multi-profile tracking server 1380, and/or user data supplier server 1394 may also be included within or implemented as application programs.

A messaging server 1392 may include virtually any computing component or components configured and arranged to forward messages from message user agents and/or other message servers, or to deliver messages to a local message store such as network device data storage 1374 or the like. Thus, a messaging server 1392 may include a message transfer manager to communicate a message employing any of a variety of email protocols including, but not limited, to simple mail transfer protocol (SMTP), post office protocol (POP), Internet message access protocol (IMAP), network new transfer protocol (NNTP) or the like. A messaging server 1392 may also be managed by one or more components of the messaging server 1392. Thus, the messaging server 1392 may also be configured to manage SMS messages; IM, MMS, IRC, or RSS feeds; mIRC; or any of a variety of other message types. In certain embodiments, the messaging server 1392 may enable users to initiate and/or otherwise conduct chat sessions, VOIP sessions or the like.

A website server 1379 may represent any of a variety of information and services that are configured to provide content, including messages, over a network to another computing device. Thus, a website server 1379 can include, for example, a web server, a file transfer protocol (FTP) server, a database server, a content server or the like. A website server 1379 may provide the content including messages over the network using any of a variety of formats including, but not limited to WAP, HDML, WML, SGML, HTML, XML, compact HTML (cHTML), extensible HTML (xHTML) or the like. A website server 1379 may also be configured to facilitate actions taken by a user of a client device to browse websites, upload user data, view and interact with advertisements or the like.

A user data aggregator server 1393 is configured to aggregate user data to be provided to user data buyers for advertising campaigns. In certain embodiments, a user data aggregator server 1393 may be configured to receive collected user data from a user data supplier server 1394. In some embodiments, a user data aggregator server 1393 may receive a query for user data. Based on the query, a user data aggregator server 1393 may generate a plurality of subsets of aggregated user data. In some embodiments, user data aggregator server 1393 may be included in a network device.

A user data supplier server 1394 is configured to collect user data. In certain embodiments, the user data supplier server 1394 may be configured to provide the collected user data to user data aggregator server 1393. In some embodiments, the user data supplier server 1394 may collect and/or provide unique user data and/or non-unique user data. In certain embodiments, the user data supplier server 1394 may aggregate the collected user data. In some embodiments, the user data supplier server 1394 may be included in any computing device such as heretofore described.

Returning to discussion of the heretofore introduced environments, the environments include components with which various systems can be implemented. Not all of the components shown may be required to practice the embodiments, and variations in the arrangement and type of the components may be made without departing from the spirit or scope of the disclosure.

Various environments in which embodiments of the disclosure operate may include local area networks (LANs)/wide area networks (WANs), wireless networks, client devices (e.g., user stations). The overall network, including any sub-networks and/or wireless networks, are in communication with, and enables communication between components in the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between other computing devices (e.g., server components). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to facilitate end-user management of one or more online activities including, in one non-limiting example, search activities, social networking activities, browse various websites, communicate with other users, participate in gaming, and/or interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between any other computing devices and/or over or between other networks or network components.

Any of the foregoing networks can be configured to couple network devices with other computing devices and communication can include communicating over the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communications links within LANs may include twisted wire pair or coaxial cable, while communications links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communications links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, a network may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A computer-implemented method for constructing a document from a set of rules, the computer-implemented method comprising:
   accessing a set of document passage templates;
   accessing a data structure comprising one or more instances of initial rules, wherein at least one of the one or more instances of the initial rules is determined based on a document type specification, and wherein the at least one of the one or more instances of the initial rules comprises a reference to a passage from the document passage templates;
   identifying a first user interface screen device to display in a human-computer interface (HCI), the first user interface screen device being based at least in part on the passage from the document passage templates;
   receiving first user input from the first user interface screen device;
   processing, in response to the first user input, at least one de-action, wherein the at least one de-action deletes one or more instances of a rule to form a modified data structure;
   retrieving, based at least in part on the modified data structure, at least one item from the set of the document passage templates; and
   generating a document based at least in part on the modified data structure and at least a portion of the set of document passage templates.

2. The method of claim 1, further comprising deleting at least one instance of a rule from the modified data structure to form a second modified data structure.

3. The method of claim 1, wherein a rule pertaining to at least one question derives from a document template.

4. The method of claim 1, wherein the document passage templates comprise at least one of, a paragraph, or a plurality of paragraphs, or a figure, or a sentence, or a portion of a sentence, or a variable specification, or any combination thereof.

5. The method of claim 4, wherein the variable specification comprises at least a variable name.

6. The method of claim 5, wherein the variable specification further comprises at least one parameter list.

7. The method of claim 1, wherein a rule comprises a first ruleset of rules that have fired and a second ruleset of rules that have not fired.

8. The method of claim 1, wherein at least one of the rules comprises a firing condition and a firing status.

9. The method of claim 1, further comprising generating an output document corresponding to the document type specification.

10. The method of claim 9, wherein the document type specification comprises at least one of, a non-final office action reply, a final office action reply, a pre-appeal brief, or an appeal brief.

11. The method of claim 1, wherein the first user interface screen device is a question group.

12. The method of claim 11, wherein the first user interface screen device comprises at least one question that is derived from an input USPTO office action document.

13. The method of claim 12, wherein the input USPTO office action document is at least one of, a non-final office action, a final office action, a notice of allowance, or a notification of missing parts.

14. The method of claim 12, wherein the at least one question corresponds to at least one of, a numeric answer, or a string answer, or a checkbox Boolean answer, or a pull-down menu item selection answer, or any combination therefrom.

15. The method of claim 12, wherein the at least one question has an answer corresponding to a question string having a string value "claim", or a string value "argue".

16. The computer-implemented method of claim 1, wherein the de-action comprises at least one of, a revert value or a remove rule.

17. The computer-implemented method of claim 16, further comprising initiating garbage collection.

18. The computer-implemented method of claim 1 further comprising presenting a second user interface screen device comprising a dynamically-generated question group to receive second user input, the dynamically-generated question group being based at least in part on the first user input.

19. The computer-implemented method of claim 1 further comprising processing the at least one de-action by deleting child rules from the modified data structure.

20. The computer-implemented method of claim 1, wherein the de-action corresponds to an unchecked checkbox.

21. The computer-implemented method of claim 1, further comprising deleting at least some child rules.

22. A non-transitory computer readable medium having stored thereon a sequence of instructions which, when stored in memory and executed by one or more processors causes the one or more processors to perform a set of acts for constructing a document from a set of rules, the set of acts comprising:
   accessing a set of document passage templates;
   accessing a data structure comprising one or more instances of initial rules, wherein at least one of the one or more instances of the initial rules is determined based on a document type specification, and wherein the at least one of the one or more instances of the initial rules comprises a reference to a passage from the document passage templates;
   identifying a first user interface screen device to display in a human-computer interface (HCI), the first user interface screen device being based at least in part on the passage from the document passage templates;
   receiving first user input from the first user interface screen device;
   processing, in response to the first user input, at least one de-action, wherein the at least one de-action deletes one or more instances of a rule to form a modified data structure;
   retrieving, based at least in part on the modified data structure, at least one item from the set of the document passage templates; and
   generating a document based at least in part on the modified data structure and at least a portion of the set of document passage templates.

23. The non-transitory computer readable medium of claim 22, wherein the document type specification comprises at least one of, a non-final office action reply, a final office action reply, a pre-appeal brief, or an appeal brief.

24. A system for constructing a document from a set of rules, the system comprising:
   a storage medium having stored thereon a sequence of instructions; and
   one or more processors that execute the instructions to cause the one or more processors to perform a set of acts, the set of acts comprising, accessing a set of document passage templates;

accessing a data structure comprising one or more instances of initial rules, wherein at least one of the one or more instances of the initial rules is determined based on a document type specification, and wherein the at least one of the one or more instances of the initial rules comprises a reference to a passage from the document passage templates;

identifying a first user interface screen device to display in a human-computer interface (HCI), the first user interface screen device being based at least in part on the passage from the document passage templates;

receiving first user input from the first user interface screen device;

processing, in response to the first user input, at least one de-action, wherein the at least one de-action deletes one or more instances of a rule to form a modified data structure;

retrieving, based at least in part on the modified data structure, at least one item from the set of the document passage templates; and generating a document based at least in part on the modified data structure and at least a portion of the set of document passage templates.

25. The system of claim 24, wherein the document type specification comprises at least one of, a non-final office action reply, a final office action reply, a pre-appeal brief, or an appeal brief.

* * * * *